United States Patent
Salem et al.

(10) Patent No.: US 9,451,612 B2
(45) Date of Patent: Sep. 20, 2016

(54) METHOD AND SYSTEM FOR JOINT COORDINATION AND COEXISTENCE IN UNLICENSED SPECTRUM

(71) Applicants: Mohamed Salem, Kanata (CA); Amine Maaref, Kanata (CA)

(72) Inventors: Mohamed Salem, Kanata (CA); Amine Maaref, Kanata (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/568,703

(22) Filed: Dec. 12, 2014

(65) Prior Publication Data

US 2016/0174217 A1    Jun. 16, 2016

(51) Int. Cl.
  H04W 72/00   (2009.01)
  H04W 72/04   (2009.01)
  H04B 17/26   (2015.01)
  H04W 16/14   (2009.01)
  H04W 84/12   (2009.01)

(52) U.S. Cl.
  CPC ......... H04W 72/0446 (2013.01); H04B 17/26 (2015.01); H04W 16/14 (2013.01); H04W 72/04 (2013.01); H04W 84/12 (2013.01)

(58) Field of Classification Search
  CPC H04W 72/0446; H04W 72/04; H04W 84/12
  USPC ............... 455/454, 450, 509, 452.1
  See application file for complete search history.

(56) References Cited

U.S. PATENT DOCUMENTS

| | | |
|---|---|---|
| 2013/0165134 A1 | 6/2013 | Touag et al. |
| 2014/0031054 A1 | 1/2014 | Zou et al. |
| 2014/0112289 A1* | 4/2014 | Kim .................. H04W 16/14 370/329 |
| 2014/0161002 A1 | 6/2014 | Gauvreau et al. |
| 2014/0185497 A1 | 7/2014 | Wolf et al. |
| 2015/0098397 A1* | 4/2015 | Damnjanovic ....... H04W 74/08 370/329 |
| 2015/0103782 A1* | 4/2015 | Xu ..................... H04L 5/001 370/329 |

FOREIGN PATENT DOCUMENTS

CN    103460740 A    12/2013

OTHER PUBLICATIONS

Berlemann, L., 'Distributed Quality-of-Service Support in Cognitive Radio Networks', Ph.D. Thesis, Feb. 2006.

(Continued)

*Primary Examiner* — Khai M Nguyen

(57) ABSTRACT

A method and system at a network element for providing a soft airtime share of unlicensed spectrum to at least one transmission point. The method includes receiving, from a plurality of transmission points, sensing results, selecting a group of candidate channels, grouping subsets of transmission points into radio access clusters, receiving, from each radio access cluster, a report, and allocating a soft airtime share to a radio access cluster for a channel at a time. Also, at a transmission point, a method and system for obtaining a soft airtime share of a channel in unlicensed spectrum. The method includes sensing a plurality of channels, providing a report, receiving a message assigning at least one radio access cluster, contending with other radio access clusters to send a beacon, receiving coordination beacons from neighboring clusters, self-scheduling and reporting in accordance with the received coordination beacons, and receiving an airtime share.

18 Claims, 20 Drawing Sheets

(56) References Cited

OTHER PUBLICATIONS

Siddique, M.M. et al., "Spectrum sharing between IEEE 802.16 and IEEE 802.11 based wireless networks," World of Wireless Mobile and Multimedia Networks (WoWMoM), 2010 IEEE International Symposium on a, pp. 1,6, Jun. 14-17, 2010.
PCT International Search Report and Written Opinion, PCT/CN2015/095582, Feb. 29, 2016, 11 Pages.

* cited by examiner

| 1210 | 1110 | 1112 | 1114 | 1115 | 1116 | 1118 |
|---|---|---|---|---|---|---|
|  |  | 2 | 4 |  |  |  |

Table 1210 @1110
$S_n = \{1112, 1114\}$

| 1212 | 1110 | 1112 | 1114 | 1115 | 1116 | 1118 |
|---|---|---|---|---|---|---|
|  | 3 |  | 1 | 3 |  |  |

Table 1212 @1112
$S_n = \{1110, 1114, 1115\}$

| 1214 | 1110 | 1112 | 1114 | 1115 | 1116 | 1118 |
|---|---|---|---|---|---|---|
|  | 5 | 4 |  | 5 | 3 |  |

Table 1214 @1114
$S_n = \{1110, 1112, 1115, 1116\}$

| 1215 | 1110 | 1112 | 1114 | 1115 | 1116 | 1118 |
|---|---|---|---|---|---|---|
|  |  | 6 | 2 |  |  |  |

Table 1215 @1115
$S_n = \{1112, 1114\}$

| 1216 | 1110 | 1112 | 1114 | 1115 | 1116 | 1118 |
|---|---|---|---|---|---|---|
|  |  |  | 1 |  |  | 4 |

Table 1216 @1116
$S_n = \{1114, 1118\}$

| 1218 | 1110 | 1112 | 1114 | 1115 | 1116 | 1118 |
|---|---|---|---|---|---|---|
|  |  |  |  |  | 2 |  |

Table 1218 @1118
$S_n = \{1116\}$

FIG. 12

METHOD AND SYSTEM FOR JOINT COORDINATION AND COEXISTENCE IN UNLICENSED SPECTRUM

FIELD OF THE DISCLOSURE

The present disclosure relates to mobile communications and in particular relates to mobile communications utilizing unlicensed spectrum.

BACKGROUND

Wireless data usage has experienced, and continues to experience, significant growth. Some estimates provide for growth in data usage exceeding one thousand times current usage in the near future. Contributing factors to this growth include higher data usage on mobile devices such as smartphones or tablets, as well as the use of data in other emerging areas such as machine-to-machine, device-to-device, or other traffic types.

Currently, significant data is provided by network operators. For example, data may be provided over cellular networks, such as those described by the Third Generation Partnership Project (3GPP) standards. Such mobile technologies include, but are not limited to, Second Generation networks such as the Global System for Mobile Communications (GSM) and Code Division Multiple Access (CDMA), Third Generation networks such as the Universal Mobile Telecommunications System (UMTS), and Fourth Generation networks such as Long Term Evolution (LTE). Also, Fifth Generation (5G) networks are starting to be developed. Utilizing the technologies in these standards, network operators provide a user equipment (UE) with data services.

Wireless data is also provided in other ways, for example, The Institute of Electrical and Electronic Engineers (IEEE) 802.11 standards for wireless local area networks (WLAN).

However, wireless spectrum is heavily utilized in many situations by network operators and in order to accommodate a significant data increase, various options including the use of unlicensed spectrum for 5G communications is being explored.

SUMMARY

One embodiment of the present disclosure provides a method at a network element for providing resources of an unlicensed spectrum band to a transmission point. The method includes receiving, from a plurality of transmission points, results from sensing channels in the unlicensed spectrum; selecting a group of candidate channels in accordance with the results from sensing channels; grouping the plurality of transmission points into at least one radio access cluster for each channel in the group of candidate channels; and allocating resources to the radio access cluster in accordance with the results from sensing the channels and the report, wherein the resources comprise a flexible proportion of the unlicensed spectrum in a frame.

Another embodiment of the present disclosure provides a method at a transmission point for obtaining resources of a channel in an unlicensed spectrum band. The method includes sensing a plurality of channels; providing a report to a network element based on results of the sensing; receiving a message providing at least one radio access cluster for the transmission point per channel; contending with other radio access clusters to send a coordination beacon on a channel; receiving coordination beacons from neighboring radio access clusters on the channel; reporting information from the coordination beacons to a network element; and receiving an allocation of resources for the channel.

BRIEF DESCRIPTION OF THE DRAWINGS

The present disclosure will be better understood with reference to the drawings, in which:

FIG. 12 is a diagram showing the neighboring tables for each RAC as populated once all beacons have been received in accordance with an embodiment of the disclosure;

DETAILED DESCRIPTION OF THE DRAWINGS

Figure 1:
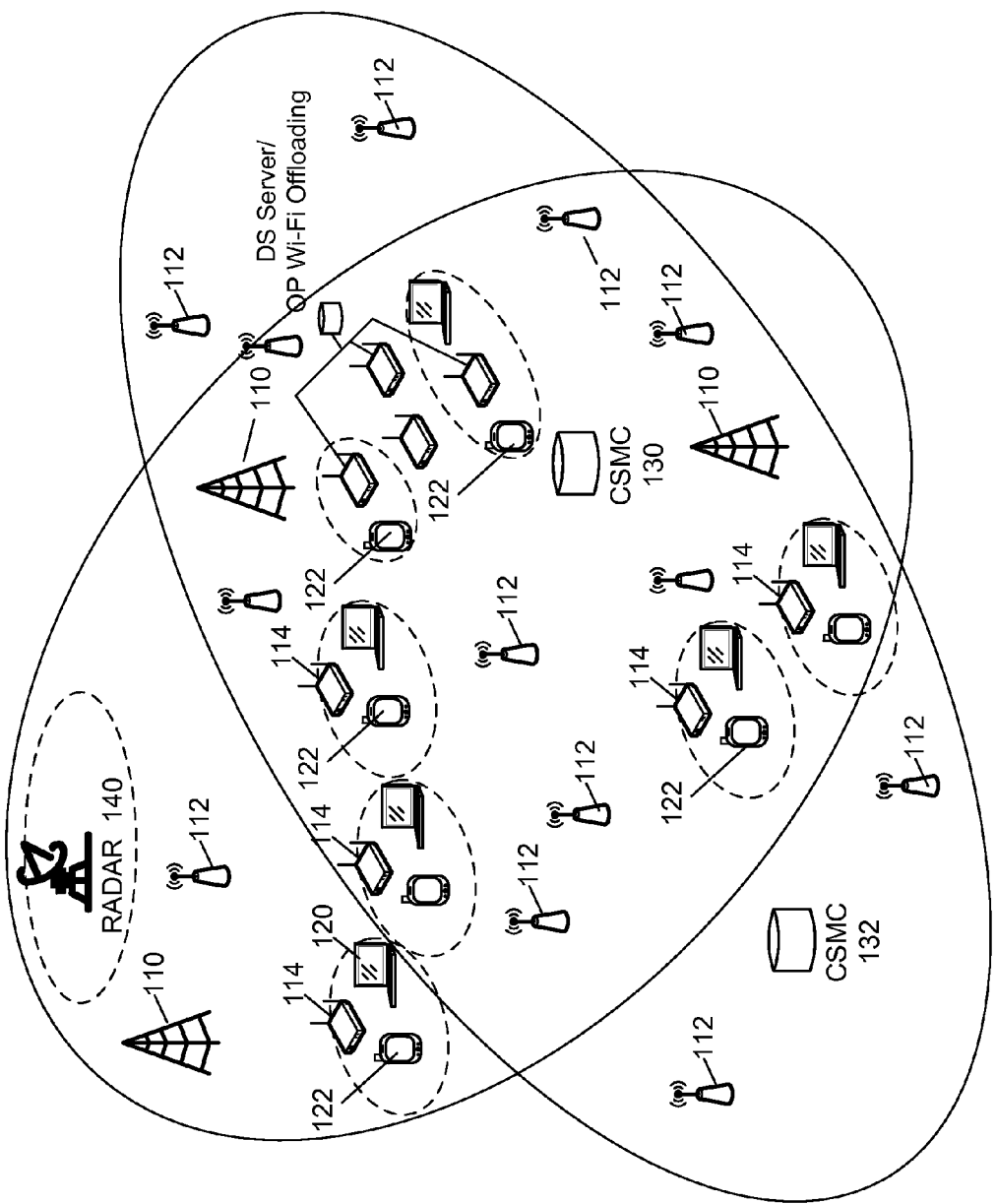
FIG. 1 is a block diagram showing one example network architecture.

Embodiments of the present disclosure provide for methods and systems to exploit unlicensed spectrum in order to ease the burden on licensed spectrum. In one aspect of the present disclosure, the use of the unlicensed spectrum also achieves target Quality of Service (QoS) and Quality of Experience (QoE) for different application scenarios and traffic types.

As used herein, "licensed spectrum" refers to a portion of radio frequency spectrum exclusively granted to a licensee within a geographic area. For example, various regulatory bodies such as the Federal Communications Commission (FCC) and the National Telecommunications & information Administration (NTIA) in the United States may provide a frequency allocation to a licensee for a portion of the radio frequency spectrum in a given band. Such license typically defines frequency ranges, geographic locations, maximum power levels, among other provisions.

"Unlicensed spectrum", as used herein, refers to a frequency band that has been allocated by regulatory agencies, to be available to unregistered users. That is, the unlicensed spectrum is a portion of the radio frequency spectrum without an exclusive licensee. Regulations may limit transmission power over such unlicensed spectrum.

In one aspect of the present disclosure, Medium Access Control (MAC) mechanisms are introduced for time-frequency joint co-existence with present occupants of unlicensed spectrum. Such present occupants may include, for example, but are not be limited to WLAN and radar systems.

In a further aspect of the present disclosure, coordination within a single wireless operator as well as between different wireless operators may be achieved.

The above may be accomplished by forming radio access clusters to contend to access unlicensed spectrum, thus avoiding having individual base stations and user equipments (UEs) individually access unlicensed spectrum. While each radio access cluster has transmission points (TPs) from the same operator. Contention between RACs from different operators and from within the same operator network may occur.

Coordination may be achieved through a regulatory-compliant channel selection and neighbor discovering technique that combines both passive and listen before talk (LBT) based active sensing mechanisms. As used herein, the term "contend to coordinate" is used to define the passive and active sensing mechanisms described herein. Such contend to coordinate techniques employ over-the-air signaling in the unlicensed spectrum.

In one aspect, the present disclosure provides for a fully distributed processing of sensing results. In a further aspect, the processing may be virtually centralized for software defined networks (SDN) or network functions virtualization (NFV) implementations.

Based on the received coordination information, a distributed or virtually centralized coordination policy may then operate to grant RAC exclusive soft airtime shares over one or more frequency channels for a number of frames. Such frames, for example, may co-exist in the time domain with other users of the unlicensed spectrum, including WLAN. The term "soft airtime shares", as used herein, indicates an allocation of a flexible proportion of a channel's resources at a given time slot. However, the proportion of the channel utilized by a transmitter may be higher than the allocated amount in a given time slot to meet QoS requirements as long as the excess time is then reallocated to others utilizing the channel in future time slots. Also, the proportion of the channel utilized by a transmitter may be lower than the allocated amount. The term "soft" indicates that the allocation is a longer-term target proportion of airtime that may be implemented in a series of optimized physical coexistence frames.

As described below, scheduling may be utilized where statistical quality of the service requirements may be involved in the scheduling decision.

Reference is now made to FIG. 1, which shows an example of two network operators operating in a geographic location. As seen in FIG. 1, various base stations 110 provide macro cell coverage for user equipments in a coverage area. Base stations 110 belong to a particular operator and in the example of FIG. 1 some of base stations 110 may belong to the first operator while some of the base stations may belong to the second operator.

Further, a plurality of access points 112 are shown in the example of FIG. 1. Such access points may, for example, belong to small cells such as pico or femto cells, as well as remote radio heads (RRHs), among other options. Such small cells may offload some traffic from the macro cells, especially near cell boundaries or in densely used areas.

WLAN access points 114 may be utilized to offload some data traffic to the unlicensed spectrum for a WLAN.

Further, as seen in the embodiment of FIG. 1, user equipments may include devices such as laptops 120, smartphones 122, among others. Such user equipments may access a WLAN through a WLAN access point 114, and may access a cellular network or a future wireless network, such as a wireless network which does not have cell-IDs, through a base station 110 or small cell access point 112.

Each network operator may further have a central spectrum management controller (CSMC). Such controller may manage spectrum allocation for transmission points (TPs) within the operator's network. In the example of FIG. 1, a CSMC 130 is operated by a first network operator and a CSMC 132 is operated by a second network operator.

To increase data transmission, one option as seen from FIG. 1, is to offload data traffic to a WLAN. However, such offloading is non-transparent to a user and does not allow for quality of service requirements generally provided by a 3GPP air interface.

In this regard, in one aspect of the present disclosure, the methods and systems port the benefits of the 3GPP air interface (AI) to the unlicensed spectrum.

The use of unlicensed spectrum for mobile communications such as 5G communications (herein referred to as 5G-U for fifth generation unlicensed spectrum usage) may present several challenges. In one embodiment, one challenge is geographically overlapping deployments of networks sharing unlicensed spectrum.

Another challenge for 5G-U is that it is impractical to coordinate operators over a common channel in the licensed spectrum or through a third party such as a brokerage. As described above, licensed spectrum usually means that the spectrum is granted to a certain network operator and may be exclusively for this network operator to use.

Also, any solution for using unlicensed spectrum may require fairness between operators and also fairness to current users of such unlicensed spectrum. For example, if the 5 GHz band is utilized for unlicensed communications, existing users may include WLAN applications, as well as applications such as radar 140 from FIG. 1.

One mechanism for 5G-U usage is to perform listen before talk (LBT). However if individual transmission points (TPs) and UEs simply use listen before talk, the time frequency resources may be unpredictable and quality of service and quality of experience may not be achieved. Further, such mechanisms do not provide for the securing of resources for periodic measurements and synchronization signaling. Also, use of listen before talk usually does not allow for advanced transmission schemes including coordinated multipoint (CoMP) or joint transmission (JT). In a LBT system, the uplink may also be attacked due to the low transmission power.

Another challenge to use unlicensed spectrum is to comply with region specific regulations. For example, in some regions certain unlicensed spectrum may be utilized by anybody, but in other regions such spectrum may be forbidden from being used.

Therefore, in order to achieve a carrier-type air interface over unlicensed spectrum, various systems are described below. The systems below will be described with regard to the 5G operations. However, this is not meant to be limiting and the present disclosure could equally be used with other standards or transmission technologies. The use of 5G-U is therefore only meant to be an example.

Figure 2:
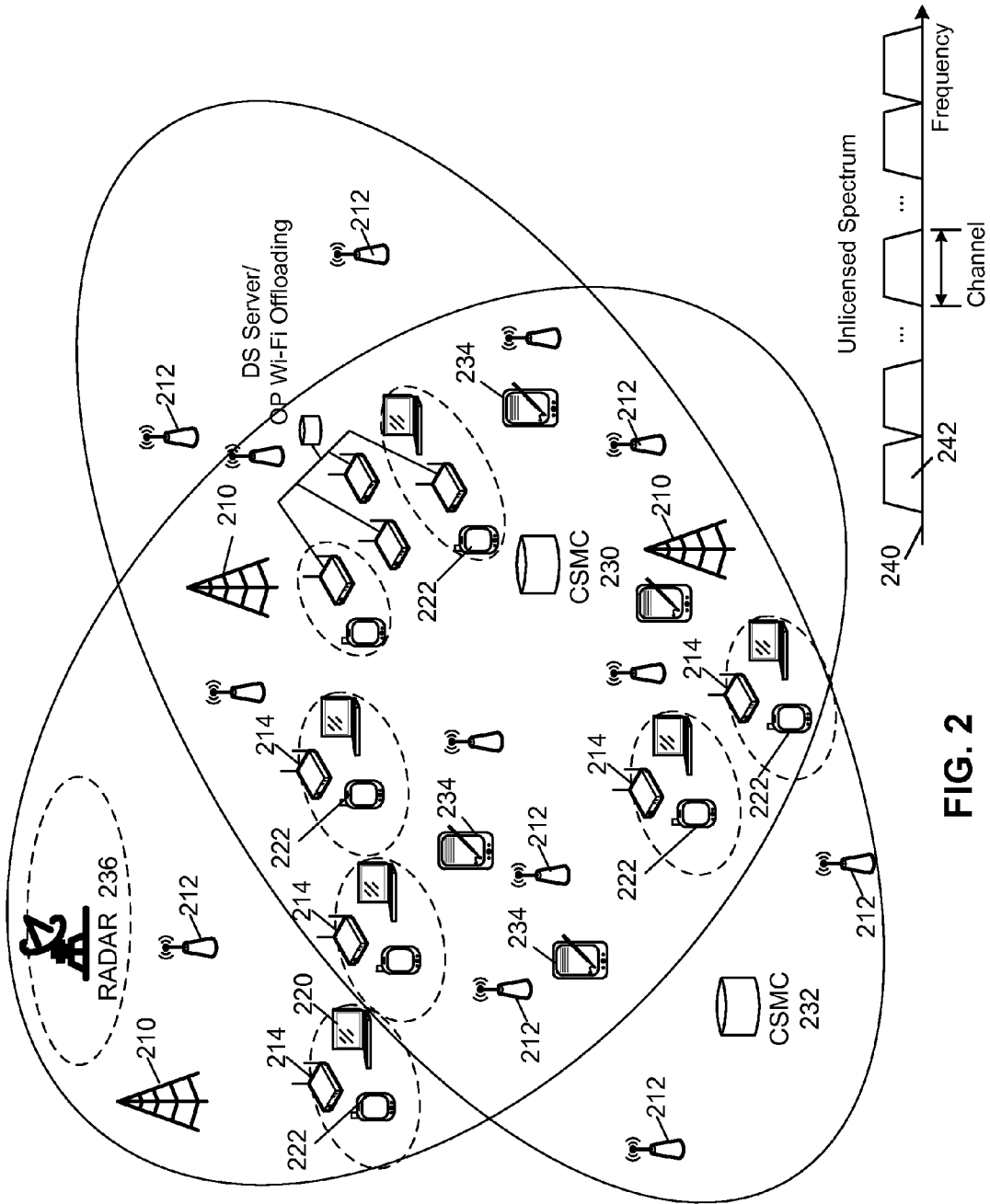
FIG. 2 is a block diagram showing a further example network architecture in which UEs capable of communicating over and utilizing unlicensed spectrum are added.

Reference is now made to FIG. 2. As seen in FIG. 2, the networks are similar to that of FIG. 1. In particular, a first operator has a first area and a second operator operates within similar geographic areas. Each utilizes base stations 210. Some of base stations 210 belong to the first operator while some of the base stations belong to the second operator.

Small cell access points 212 belong to either the first operator or the second operator. WLAN access points 214 can either belong to households or businesses or may be used by operators to provide for Wi-Fi offloading.

User equipments such as a laptop 220 or smartphone 222 may access either the licensed spectrum of an operator or a WLAN through an WLAN access point 214.

Further, each operator includes a CSMC, shown as CSMC 230 for a first operator and CSMC 232 for a second operator.

Radar 236 may be utilizing a portion of the unlicensed spectrum.

In the example of FIG. 2, UEs 234 are enabled to utilize the unlicensed spectrum for 5G-U communications in accordance with the present disclosure. Specifically, as seen in FIG. 2, a map of unlicensed spectrum 240 provides for a plurality of channels 242 within the unlicensed spectrum. For example channels 242 may each have 20 MHz bandwidth. However, this is merely an example and other bandwidths could be allocated to a channel.

Thus, the present disclosure provides for use of unlicensed spectrum for 5G communication. In one aspect, 5G-U operators define radio access clusters (RACs) to compete for unlicensed frequency channels. The selection of potential channels is based on long term WLAN average spectrum utilization (ASU) measurements by each RAC and the detection of other usage, including radar activity. Each RAC creates a list of selected channels for potential communication.

As described below, the RACs then contend to coordinate on their selected channels during a WLAN immune multi-node active sensing phase of the coordination. During this phase, beacons are sent and autonomous configuration of per channel competing RACs may be done utilizing the received beacons from neighboring RACs.

The contention to coordinate provides for a fully distributed coordination through inter-RAC asynchronous schedulers granting exclusive soft airtime shares to each RAC.

Figure 3:
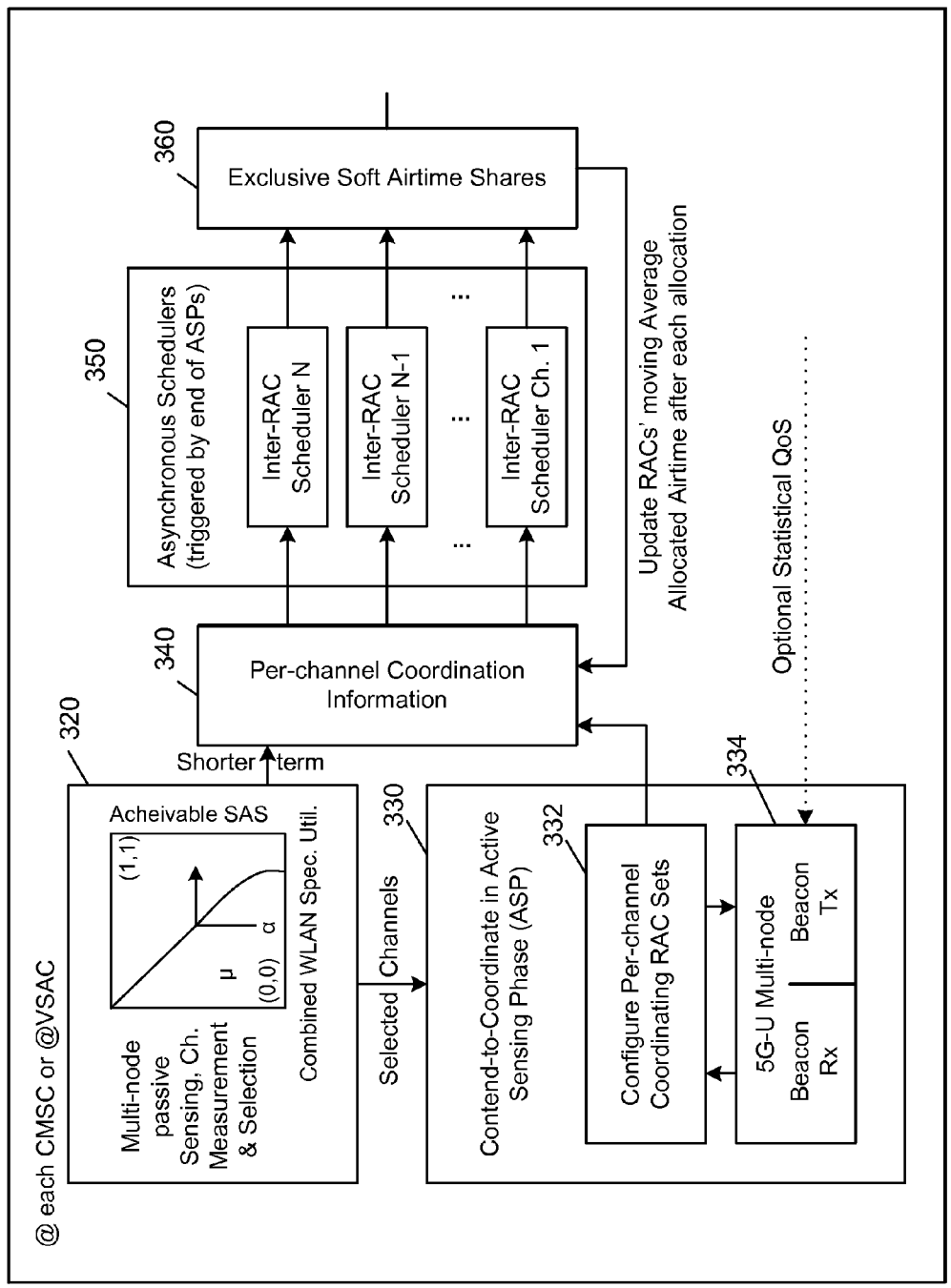
FIG. 3 is a block diagram showing logical blocks for implementing one embodiment of the present disclosure.

Reference is now made to FIG. 3, which shows a block diagram providing an overview of one embodiment of the present disclosure. As seen in FIG. 3, for each central spectrum management controller or virtual spectrum access controller, a plurality of logical blocks are provided.

A first block 320 is a multi-node passive sensing channel measurement and selection block. The multi-node passive sensing may be done by every transmission point (TP) within a geographic area in one embodiment. In other embodiments, the network may configure only a few TPs to do the passive sensing. This may, for example, comprise a group of sensing nodes that perform the sensing.

The passive sensing at block 320 allows the TP to create a list of candidate channels. Once the passive sensing at block 320 is finished, the solution of FIG. 3 provides a list of the selected candidate channels discovered during the passive sensing to a block 330.

Block 330 performs various functionality including performing an active sensing phase and creating a per-channel RAC set. Specifically, at sub-block 332, each CSMC or virtual spectrum access coordinator (VSAC) configures coordinating RAC sets for each channel. Further, at sub-block 334, the active sensing phase includes the reception and transmission of beacons. Overall, the operation of block 330 is described below and provides a way of discovering who the neighbors are for each RAC within a network.

Information from the passive sensing block 320 as well as the configured per channel coordinating RAC sets from sub-block 332 are provided to a per channel coordination information block 340.

Block 340 represents the input information provided to scheduling block 350, which runs schedulers for each channel. Information from the schedulers includes exclusive soft airtime grants, which are represented by block 360 is a logical block showing the outcome of the scheduling block allocating the soft airtime shares for each channel.

The soft airtime shares may then be used to provide a 5G air interface over the unlicensed spectrum while ensuring quality of service parameters. However such air interface is beyond the scope of the present disclosure.

Each of blocks 320 to 360 is discussed in more detail below.

Specifically, the passive sensing block 320 provides an operation that spans a long time scale and is conducted every observation period, denoted herein as $T_{OBS}$. The operation may take minutes and provides information to the remaining blocks.

Such information may include qualitative measurements for available channels in the geographic location of a transmission point. For example, long term time averaged WLAN channel utilization may be realized, while a short-term average WLAN channel utilization may be generated to update coordination information. Further, the sensing of other spectrum utilization including radar or other users of the unlicensed spectrum may be detected by the passive sensing phase.

Passive sensing block 320 may further include information about region specific regulatory rules for accessing unlicensed spectrum, such as dynamic frequency selection (DFS). For example, some channels may be available in Japan that would not be available in the US or Europe, and vice versa. Passive sensing block 320 may be provided with local regulatory information to allow for such regulatory rules to be applied to a candidate list of channels.

After the observation period, the available frequency channels may then be provided to block 330.

Therefore, referring again to FIG. 2, the small cells 212, or a subset thereof, may perform the passive sensing, where the unlicensed channels are passively scanned and periodically may be sampled.

Figure 4:
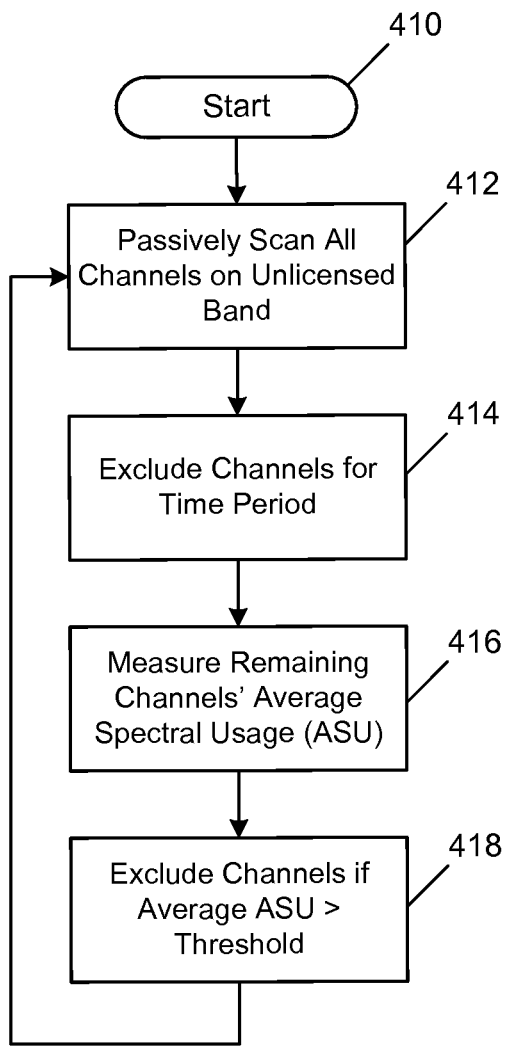
FIG. 4 is a process diagram showing the selection of candidate channels in accordance with an embodiment of the disclosure.

Reference is now made to FIG. 4, which shows a passive sensing and channel selection procedure. In particular, the process of FIG. 4 starts at block 410 and proceeds to block 412 in which all TPs or a geographically distributed subset of TPs managed by a central spectrum management controller perform passive sensing over all channels across the unlicensed band.

The process then proceeds to block 414 in which certain channels are excluded for a time. In one embodiment, the exclusion is based on various factors including region-specific regulatory rules such as DFS, the detection of radar activity on certain channels, among other factors. Non-excluded channels may then be reassessed in a following observation period.

The process then proceeds to block 416 in which a sensing TP measures an average spectrum utilization (ASU) of each available channel, generally on two time scales. Unlike WLAN, a sensing TP does not randomly select a channel from the available list but rather performs an accurate measurement of the spectrum utilization of the channel. For example, other entities such as a WLAN may be utilizing such channel.

The two time scales are a long term average channel utilization and a short term average channel utilization. The long term time average channel utilization is done on a time scale referred to as $T_{OBS}$ and is used for channel selection. The short term time average channel utilization is referred to herein as $T_{coord}$ and is used for coordination or scheduling among 5G-U RACs.

In block 416, measurements are continually conducted on available channels and are not strict in timing. On channels where the 5G-U transmission is present, the sensing is done during idle periods left for WLAN access.

Figure 7:
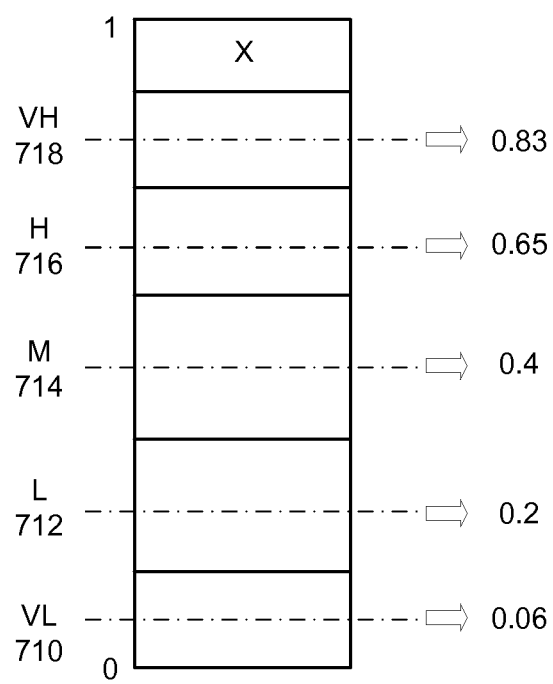
FIG. 7 is a block diagram showing levels of spectrum utilization in accordance with an embodiment of the disclosure.

The process then proceeds to block 418 in which a TP excludes channels with a long term time average spectrum utilization that is above a standard-value threshold from its available channels list for the following observation period, as for example shown in FIG. 7. This results in a list of "selected channels" that may be provided to a coordination block and further to a scheduler.

As seen in FIG. 4, the process continues from block 418 to passively scan at block 412 and perform the process of blocks 414, 416 and 418. By this way, as shown by FIG. 4 in accordance with an embodiment of the invention, the channels are selected in accordance with the sensing over channels across the unlicensed band. A current selected channels list may then be provided to block 330 of FIG. 3 above, namely the active sensing and contend-to-coordinate block.

Figure 5:
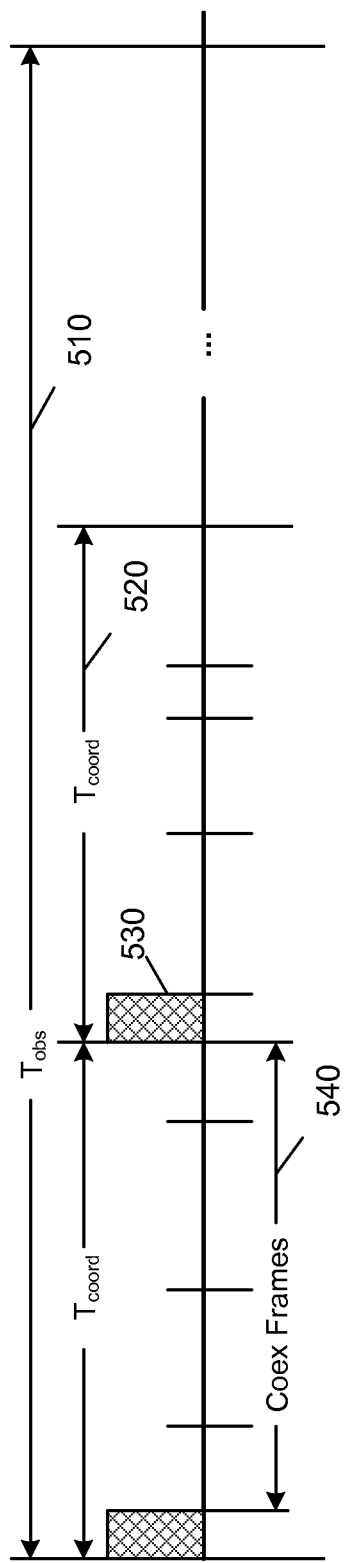
FIG. 5 is a time line showing an observation period and a coordination period, the coordination period having an active sensing phase and one or more coexistence frames in accordance with an embodiment of the disclosure.

Reference is now made to FIG. 5, which shows a time line of the observation and coordination time scales above, along with the active sensing phase described below. As seen in FIG. 5, both the long and short time periods are provided. Specifically, $T_{OBS}$ time period 510 is shown to be much longer than the $T_{coord}$ time period 520.

Further, as seen in FIG. 5, during the $T_{coord}$ time period 520, an active sensing phase (ASP) 530 and a co-existence frame ("coex frame") 540 exist.

The operation of block 330 from FIG. 3 above is conducted every coordination period 520. The observation period encompasses multiple coordination periods.

Specifically, an active sensing phase 530 is used by each RAC to provide beacons that may be detected by neighboring RACs, allowing RAC to compile a list of neighbors and attributes of the neighbors.

First though, based on the results of the observation, a per channel grouping of TPs within the same vicinity and having close short term ASU values are grouped into radio access clusters. The CSMC or VSAC create the RAC on a per-channel basis, and communicate the RAC clusters to the TPs. Thus, for each candidate channel, RACs are created, each having at least one TP. Two or more TPs may be grouped into a single RAC on a channel if the TPs are close in proximity and ASU value.

A TP may therefore be assigned to a plurality of RACs, with each RAC for that TP having a different channel. The RACs for the TPs also may have different members. For example a first TP may be assigned to a first RAC on a first channel and a second RAC on a second channel. The second RAC may have a different set of TPs than the first RAC in some embodiments.

Figure 6:
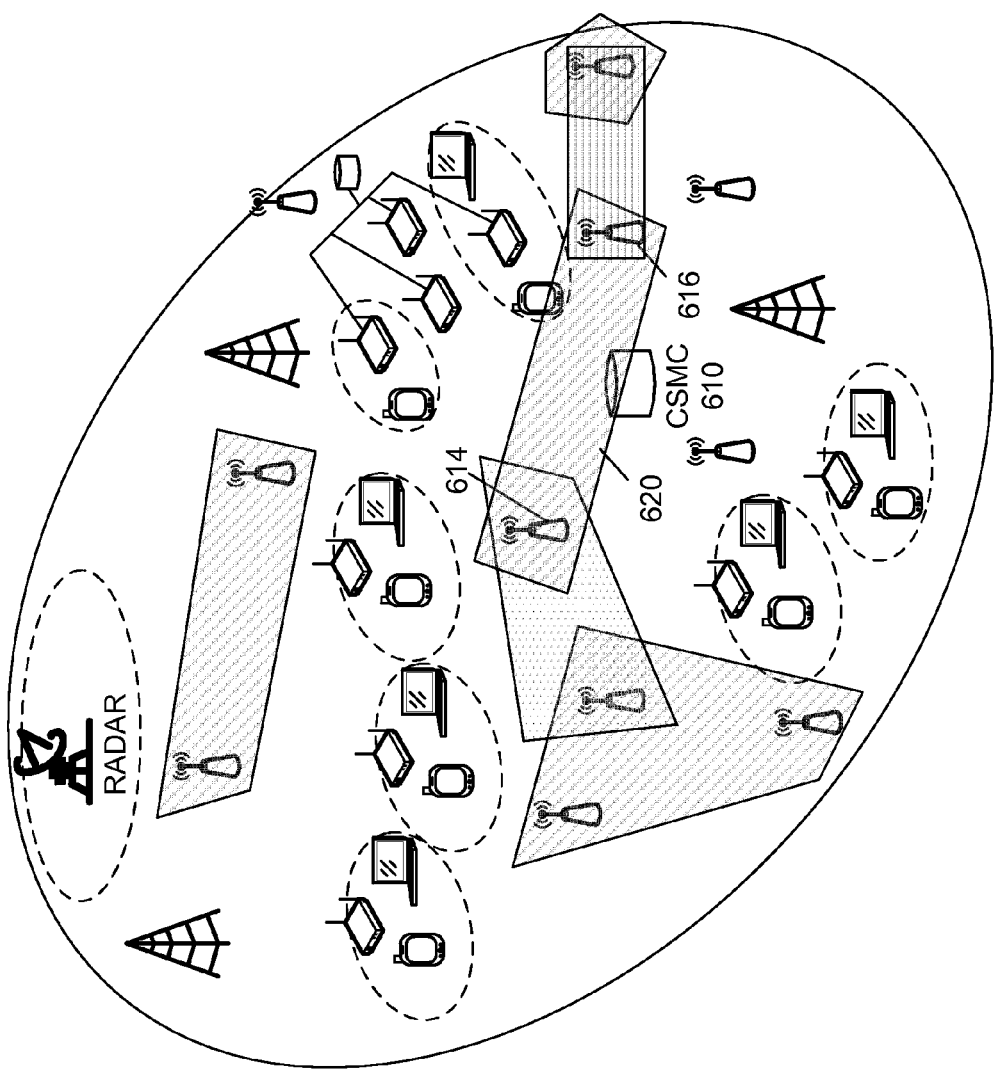
FIG. 6 is a block diagram showing a network in which TPs have been grouped into radio access clusters, wherein the various clusters may represent a cluster for a particular channel in accordance with an embodiment of the disclosure.

For example, as seen in FIG. 6, for a specific channel in a specific coordination period, RACs may be formed by grouping TPs with close short term ASU measurements at a CSMC. "Close short term ASU measurements", as used herein, could mean that the short term ASU measurements are within a threshold value of each other. Thus in FIG. 6, CSMC 610 may, for a particular channel, group TPs 614 and 616 into an RAC 620 based on the characteristics and geographic location of TPs 614 and 616.

Thus, the grouping of the TPs into an RAC is conducted every coordination period 520. The CSMC may group TPs with close short term measurements in their vicinity to other similar TPs by exploiting the locality of WLAN activities for given unlicensed channels among long term selected lists. The measurements may either be the short term WLAN ASU value for TP measurements on the channel or may be the corresponding short term achievable soft airtime share (SAT). For example, referring to FIG. 7, a quantization scheme for short term WLAN ASU values is provided. In the example of FIG. 7, the channel can either go from being not used at all to being completely used on a spectrum. The usage may be grouped into various categories including very light (VL) 710, light (L) 712, medium (M) 714, high (H) 716 and very high (VH) 718. However, such delineations in the spectrum are merely an example and more or less categories could be provided. The mapping function can map from WLAN ASUs to 5G-U achievable soft airtimes and may be a non-linear function.

In some embodiments, the standard linear or non-linear quantization scheme may be employed to bin the measurements for grouping. Each bin level represents the RAC's combined short term measurement.

The RACs are channel specific and are disjoint for the duration of the coordination period only. In this way, a TP could be a member of multiple RACs across the unlicensed spectrum within various different channels in that unlicensed spectrum.

All RACs formed by the same CSMC therefore contribute to one averaged allocated airtime (AAA) value.

Once the RAC is created, an active sensing for a contend-to-coordination frame synchronization may occur at block 330 from FIG. 3 above. The contend-to-coordinate function includes various attributes. These include active sensing, also referred to as over the air polling, on selected unlicensed channels at an instance where the medium is free to discover neighboring 5G-U RACs interested in accessing the same channel, while obeying region specific transmission power control (TPC) rules.

As described below, the contend-to-coordinate operation further includes the detecting of polling responses from polled RACs and the coordination, fairness and identity information therein.

The contend-to-coordinate functionality further configures a set of RACs on which the distributed coordination policy operates at each CSMC.

The contend-to-coordinate operation further includes per channel synchronization of the coordination frames among competing 5G-U RACs on the commonly selected channels.

Figure 8:
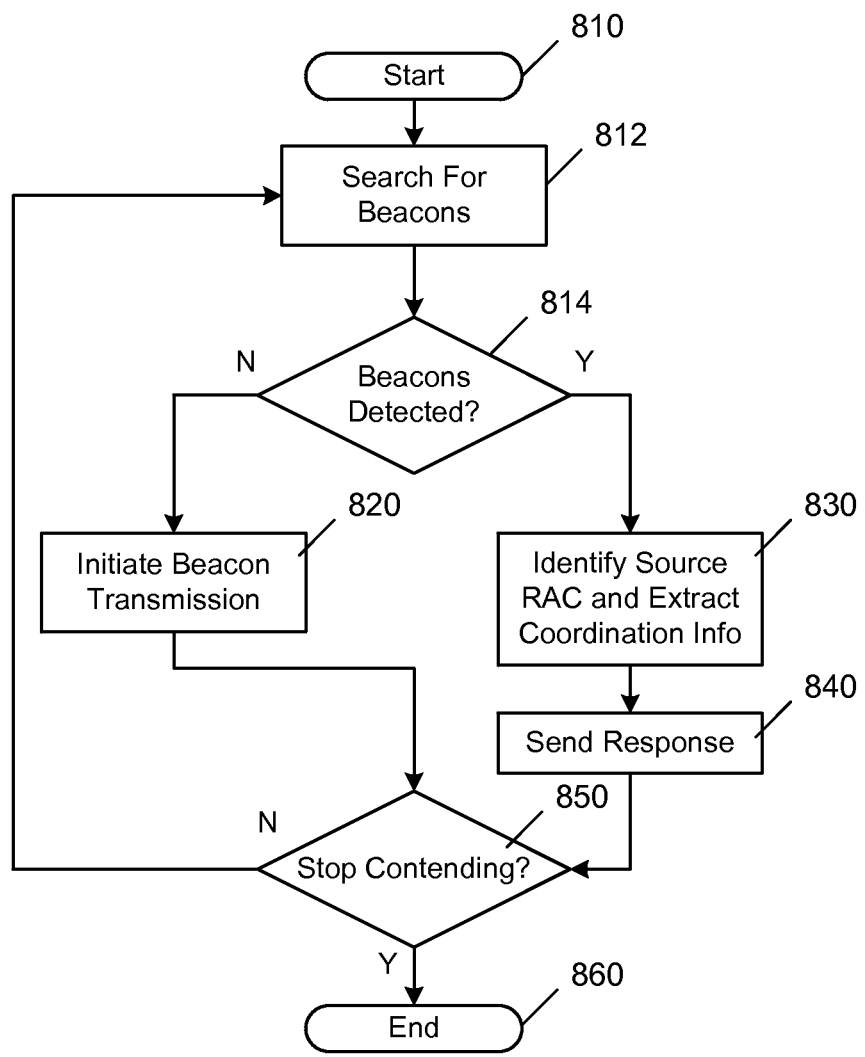
FIG. 8 is a process diagram showing the contention to coordinate in accordance with embodiments of the present disclosure in accordance with an embodiment of the disclosure.

Thus, once the RACs are allocated, each RAC performs an active sensing phase. Reference is now made to FIG. 8, which shows a process diagram for the active sensing phase. The process of FIG. 8 starts at block 810 and proceeds to block 812 in which a starting 5G-U RAC searches for a sequence of beacons marking the beginning of the coordination frame of existing RACs on every channel within the RAC's selected list. In the present disclosure, a coordination frame is composed of a short active sensing phase 530 from FIG. 5 above, followed by multiple co-existent frames 540 of time-multiplexed 5G-U and WLAN transmission.

Specifically, given a soft airtime share allocated to a TP cluster on a channel in the unlicensed spectrum within the upcoming time window, a dynamic implementation for resource reservation in the form of QoS-optimized time-multiplexed transmission slots forming coexistence frames may be accomplished. Optimization of such coexistence frames may take into account the use of unlicensed spectrum and its suitability for carrier-type air interface, the coexistence efficiency gained by eliminating airtime loss in the form of overhead, quality of service requirements for served flows, as well as quality of service access categories for existing WLANs if applicable. In some embodiments, a coexistence frame may only include resources from the 5G network. As an alternative embodiment, a coexistence frame may only include resources from a WLAN network.

The coordination beacons from block 812 of one RAC are broadcast either by joint transmission from the TPs in the RAC, or successively with standard affixed time gaps ($T_{gap}$) from the RAC. The choice of joint or successive transmissions with fixed time gaps may be based on factors such as the feasibility of joint transmission in terms of synchronization and hardware support, among other factors.

In the case of successive transmission, the time gap may be less than the point coordination function (PCF) inter-frame space (PIFS). The broadcasting may be done isotropically at a maximum TPC allowed effective isotropic radiated power (EIRP) level. Further, the broadcast may use the most reliable modulation and coding scheme (MCS). If sequential, the broadcasting may be done in an order of the local indices of TPs in one embodiment.

Further, in one embodiment, the coordination sequence may be preceded by a jointly transmitted fake WLAN clear to send (CTS) frame. In other embodiments, the coordination sequence may be preceded by a sequence of fake WLAN CTS frames spaced by a short inter-frame space (SIFS) duration with their NAV duration fields set to the remaining time span of the active sensing phase (ASP) to force surrounding WLANs to defer contention to the end of the ASP. Further, if only one TP exists within the RAC, the single TP can send the WLAN CTS frame prior to the coordination sequence.

The coordination beacons mainly carry information such as the 5G-U operator identifier, MSC identifier, the RAC identifier, the beacon order in sequence, the remaining time span of the ASP, the CSMCs updated actual AAA, short time WLAN ASU (or its mapping to achievable SAT) and possibly statistical QoS measurements of RACs traffic. However, the above list is not meant to be limiting, and a subset of the above information may be provided, as well as other information not included in the list above.

After the search for beacons of block 812, the process of FIG. 8 next proceeds to block 814 in which a check is made to determine whether any beacons are detected. If no existing coordination beacons are detected within a coordination time period on a certain channel, the CSMC may initiate the beacon sequence transmission as a reference for other interested RACs to synchronize to upon their access attempt. This is shown with regard to block 820.

In subsequent coordination frames, the initiator RAC always starts its ASP at its due instance under the NAV protection of a fake CTS sequence at the end of the last coexistence frame 540.

Conversely, from block 814, if a coordination beacon has been detected, the detecting RAC is not the initiator on the channel. It identifies the source RAC in block 830 and extracts coordination information contained in the beacon. The RAC that has detected the coordination beacon can then find the original reference point using the remaining time span of ASP values found in the beacon.

From block 830, the process proceeds to block 840 in which a response to the beacon is sent. An RAC needs to contend with other RACs to send its response within its own coordination beacon. The RAC waits for a random backoff time after sensing an idle medium. The random backoff time may be generated from a standardized function with a small contention window in some embodiments.

From block 820 or 840, an RAC stops contending on a channel if any one of three conditions exists. The RAC stops contending if an announcement of scheduling decisions is enabled and the RAC is not self-scheduled or has announced already. Further, the RAC stops contending if the sharing of the response table is enabled and no new entries are in the table (after the last response) to communicate. Also, the RAC stops contending if the ASP duration has elapsed.

From block 850, if the RAC needs to stop contending, the process proceeds to block 860 and ends. Otherwise, the process may proceed back to block 812 and search for further beacons.

Figure 9:
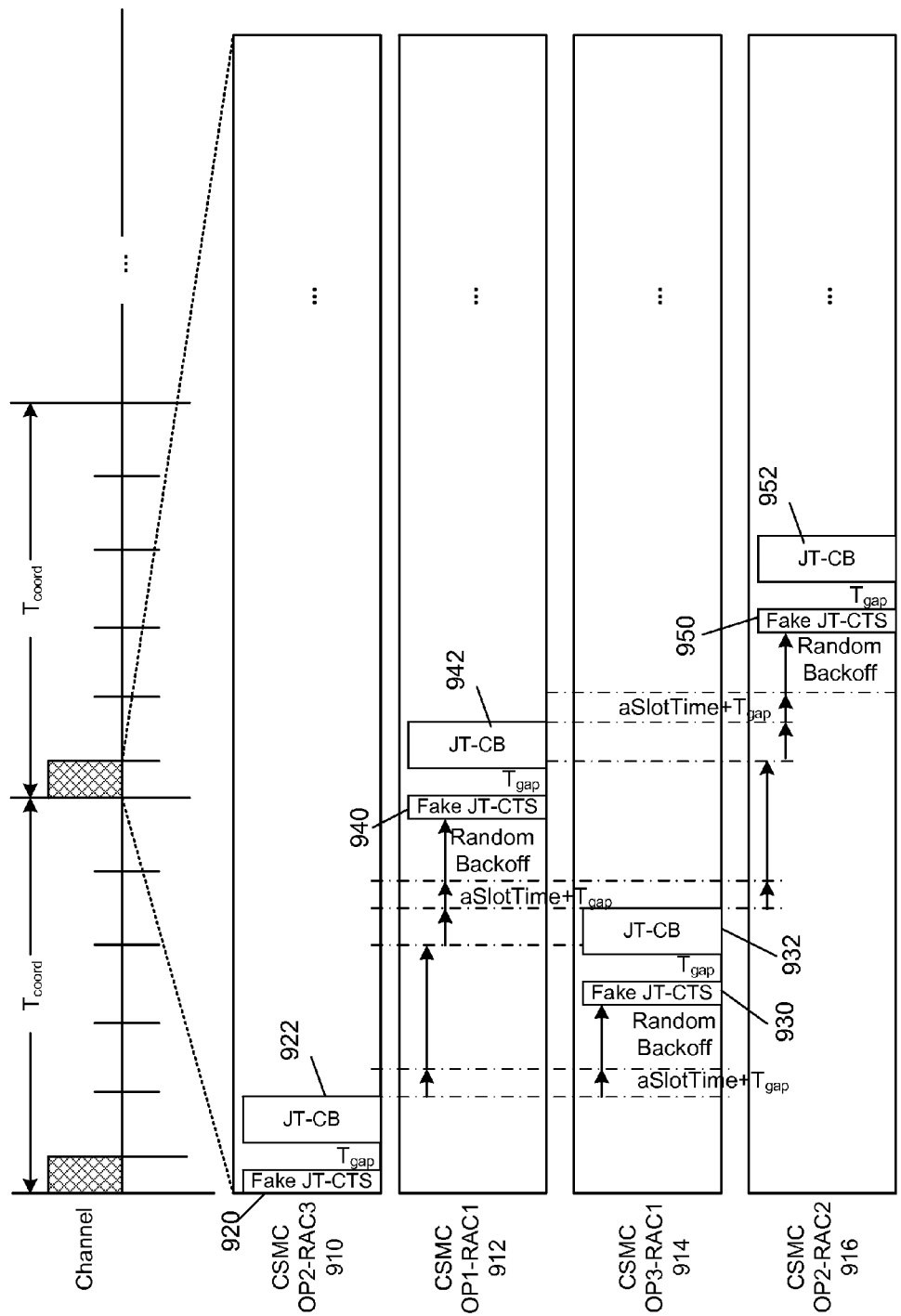
FIG. 9 is a block diagram showing the joint transmission of fake WLAN CTSs and coordination beacons during an active sensing phase in accordance with an embodiment of the disclosure.

Reference is now made to FIG. 9 which shows the sending of transmissions of a beacon from different nodes. In particular, as seen in FIG. 9, three operators are present, and RACs are provided. In this case, a first operator RAC 910 is the initiator, and operator RACs 912, 914 and 916 are neighbors.

Operator RAC 910 first sends a fake transmission CTS, as shown by signal 920. After a specific time gap designated $T_{gap}$, the initiator RAC 910 then sends its coordination beacon 922.

Each of RACs 912, 914 and 916 receive the beacon and wait for a time period, designated as aSlotTime+$T_{gap}$, and then set a random backoff time.

In the example of FIG. 9, RAC 914 has the shortest backoff time and provides its fake joint transmission CTS as shown by block 930. After a time $T_{gap}$, RAC 914 then sends its beacon response, as shown by block 932.

Similarly, after a time period designated as aSlotTime+$T_{gap}$, random backoff times are set at the remaining RACs and in the example of FIG. 9 RAC 912 has the next shortest backoff time. It then sends its fake joint transmission CTS, as shown by signaling block 940. After a time $T_{gap}$, the RAC 912 then sends its coordination beacon as shown by signal block 942.

Similarly, in the example of FIG. 9, RAC 916 waits for the aSlotTime+$T_{gap}$ and then a random backoff time before sending its fake joint CTS transmission as shown by signaling block 950. After a time gap, RAC 916 sends its coordination beacon, as shown by signaling block 952. In the example of FIG. 9, if only a single TP exists with the RAC, then instead of a joint transmission CTS, a single transmission CTS is performed.

Figure 10:
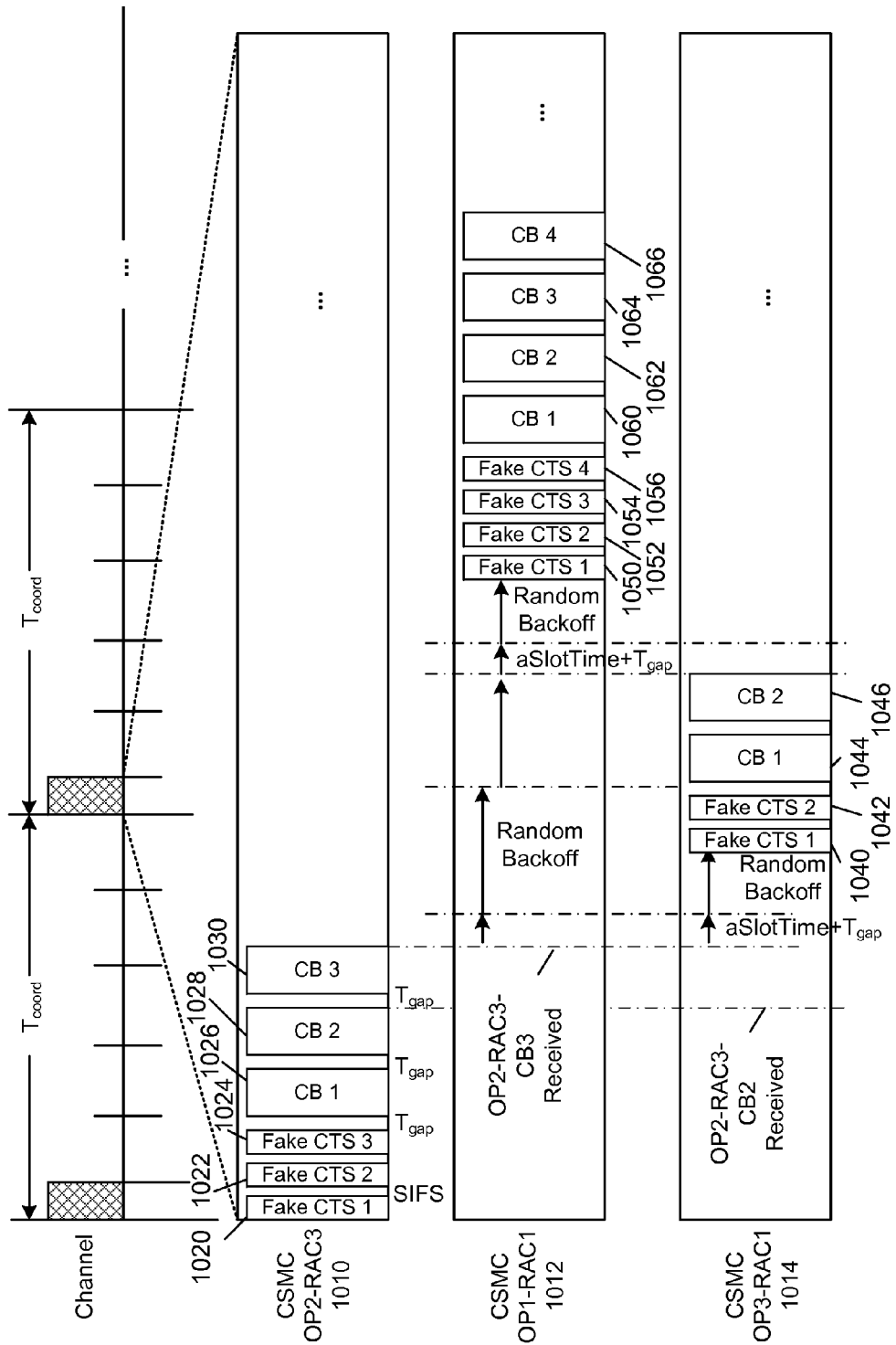
FIG. 10 is a block diagram showing the sequential transmission of fake WLAN CTSs and coordination beacons during an active sensing phase in accordance with an embodiment of the disclosure.

Referring to FIG. 10, in an alternative embodiment, instead of joint transmissions, sequential transmissions may be made. Thus, in the example of FIG. 10, RACs 1010, 1012, 1014 are shown. In this case, RAC 1010 is the initiator and it sends from each TP within the RAC, a fake CTS spaced by a short inter-frame space (SIFS).

In the example of FIG. 10, three TPs exist within RAC 1010 and therefore three fake CTS transmissions are made, as shown by signaling blocks 1020, 1022 and 1024.

After all the fake CTS blocks are sent, the coordination beacons may be sent. Again, this is done sequentially in the example of FIG. 10 and therefore three coordination beacons are sent from the three TPs, as shown by signaling blocks 1026, 1028 and 1030 in the example of FIG. 10.

After all of the CBs for RAC 1010 have been sent, each of the remaining RACs waits for a time, designated as aSlotTime+$T_{gap}$ and a backoff timer is then set. In the example of FIG. 10, RAC 1014 has the shortest backoff time and it sends its fake CTS signaling at the end of the backoff time. Specifically, as shown in FIG. 10, two TPs exist within RAC 1014, and the fake CTSs are sent in blocks 1040 and 1042. After a time gap, the CBs are then sent. In FIG. 10, two TPs are provided in RAC 1014 and the CBs are thus shown with signaling blocks 1044 and 1046.

Further, after a time gap and random backoff time, RAC 1012 next sends its CTSs. As seen in FIG. 10, RAC 1012 has four transmission points and therefore four CTSs are sent sequentially, shown by blocks 1050, 1052, 1054 and 1056. Subsequently, after a time gap, the CBs for the TPs are sent sequentially from RAC 1012. These are shown with blocks 1060, 1062, 1064 and 1066.

However, the examples of FIGS. 9 and 10 are not limiting. More or less RACs could exist within neighboring cells of a particular RAC, and further any number of TPs could exist within any RAC.

Figure 11:
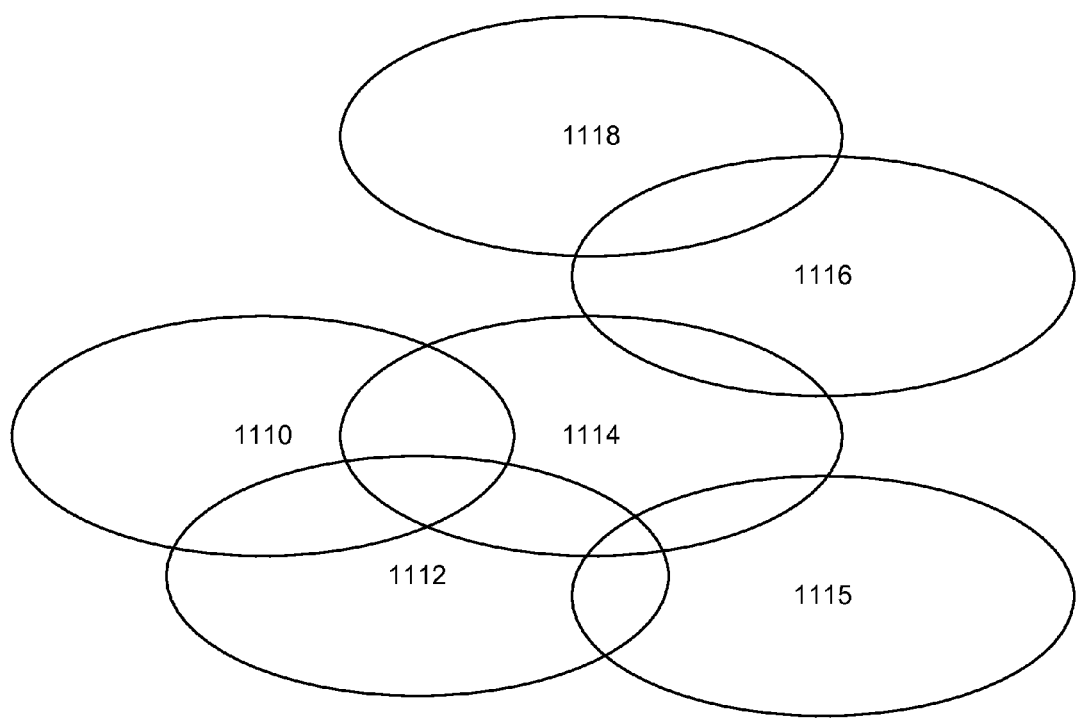
FIG. 11 is a block diagram showing neighboring RACs on a given channel, where overlap signifies mutual impact or potential collision in accordance with an embodiment of the disclosure.

Once the RACs receive the beacon signal from all of their neighbors, the RACs may then make scheduling decisions for a particular channel. Reference is now made to FIG. 11.

As seen in FIG. 11, an example block diagram is shown providing example coverage areas of a plurality of RACs. Overlapping portions between RACs show the neighboring RACs.

RACs provide information to neighbors in the form of a beacon channel. The beacon may either include information about only the RAC sending the beacon on one embodiment.

In other embodiments, the RAC beacon may include information already received from other neighbors in addition to the information for the sending RAC. The examples below assume that only information about the sending RAC is included in the beacon. However, this is not limiting and the sharing of neighbor information could equally be used with the embodiments of the present disclosure.

In accordance with the embodiment of FIG. 11, an RAC only cares about its immediate neighbors when there is no sharing of polling responses. Thus, as seen in FIG. 11, RAC 1110 has neighbors RAC 1112 and RAC 1114.

Similarly, RAC 1112 has neighbors RAC 1110, RAC 1114 and RAC 1115.

RAC 1114 has neighbors RAC 1110, RAC 1112, RAC 1115, and RAC 1116. Further, RAC 1116 has neighbors RAC 1114 and RAC 1118, and RAC 1118 has neighbor RAC 1116.

Reference is now made to FIG. 12, which shows an example of the autonomous configuration of competing RAC sets and announcements. In this case, no sharing of polling response tables is provided and self-scheduling RACs announce their decision. Thus, as seen in FIG. 12, each RAC has a table associated with its neighbors.

In FIG. 12, Table 1210 is for RAC 1110 of FIG. 11. Similarly, Table 1212 is for RAC 1112. Table 1214 is for RAC 1114, Table 1215 is for RAC 1115, Table 1216 is for RAC 1116 and Table 1218 is for RAC 1118.

Thus, in accordance with the embodiment of FIG. 12, RAC 1110 receives beacons from RAC 1112 and RAC 1114, and populates its polling response table 1210 with information from the received beacons. Similarly, the remaining RACs receive neighbor beacons and populate their polling response tables.

Once all of the coordination beacons have been received, each RAC may make an announcement for their scheduling decisions. The announcement of scheduling decisions is based on an order in accordance with a pre-defined scheduling algorithm. For example, such scheduling algorithm may be pre-defined in standards associated with the 5G-U communications. Otherwise, the scheduling algorithm may be distributed, for example, by operators.

Following the examples of FIGS. 11 and 12, if the scheduling algorithm determines that RAC 1110 has priority, followed by RACs 1112, 1114, 1115, 1116 and 1118 in that order, then RAC 1110 is the first to announce whether it is taking a channel. Its direct neighbors, namely RAC 1112 and RAC 1114 will see the scheduling result. Thus RAC 1110 contends to announces its decision immediately once an "Announce Results" portion of the active sensing phase starts.

Since RAC 1112 and RAC 1114 have RAC 1110 within their ordered set and RAC 1110 takes precedence over the scheduling of RAC 1112 and RAC 1114, therefore, RACs 1112 and 1114 do not schedule.

After a certain delay, RACs 1115, 1116, and 1118 do not receive any announcement from the RACs at the top of their sets. For example, for RAC 1115, the RAC with the highest priorities in its set of neighbors is RAC 1112, followed by RAC 1114. However, as discussed above, neither of RACs 1112 or 1114 schedules due to the higher priority scheduling in their neighbor sets.

In this case, RACs 1115, 1116, and 1118 contend to announce that they have assumed the channel use. In the case of RAC 1115, it can take the channel after it makes its announcement, since RAC 1116 and RAC 1118 are not neighbors.

For RAC 1116 and RAC 1118, if they are self-scheduled, and if RAC 1118 precedes RAC 1116 in its announcement during the announce results portion of the ASP block, RAC 1116 will refrain from using the channel.

In one embodiment, if RACs 1116 and 1118 happen to be within the same operator CSMC, scheduling may be assisted by the CSMC, and then only RAC 1116 will contend to assume the channel whereas RAC 1118 may still share or reuse it.

Therefore, the above describes a method and system for various RACs to assume a channel in the unlicensed 5G-U spectrum.

In an alternative embodiment, the RACs may further share their polling response tables. In this case, each RAC may have a complete knowledge of the other RAC polling tables in order to make scheduling decisions.

The order for making scheduling decisions may be based on a scheduling algorithm and may be determined by each TP within an RAC, or by each CSMS (or each VSAC if virtual network resources are used) in some embodiments.

Further, even though an RAC has self-scheduled a channel, it needs a soft airtime share for the channel to share with other users of the channel. As described above with regards to FIG. 3, once the coordination information has been determined at block 330, the information is provided to blocks 340 and 350.

Figure 13:
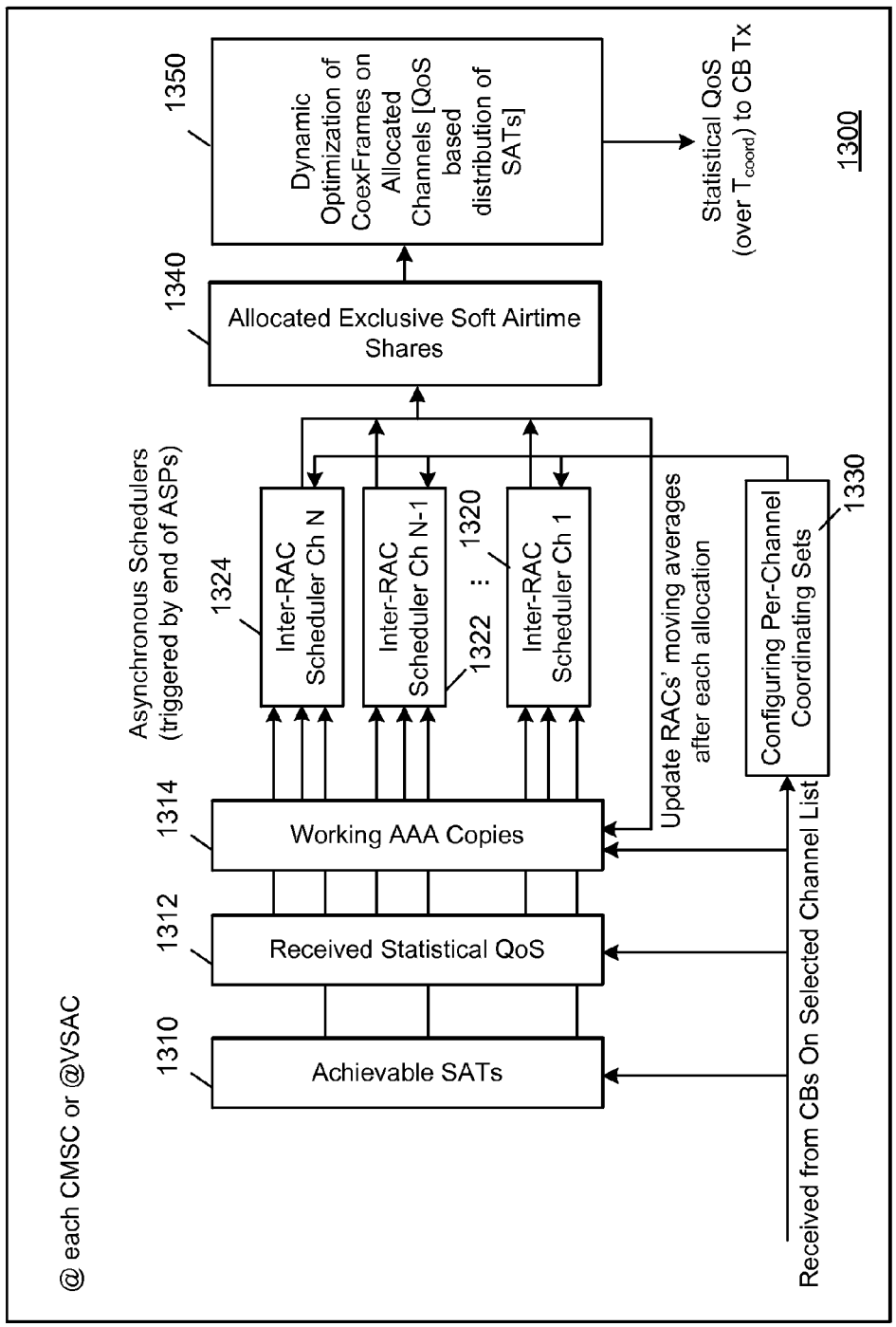
FIG. 13 is a block diagram showing the scheduling of soft airtime shares in accordance with one example of the present disclosure in accordance with an embodiment of the disclosure.

Reference is now made to FIG. 13, which shows an inter-RAC scheduling operation conducted on each of the unlicensed channels once the coordinating sets are configured at the end of the active sensing phase. Given the short term WLAN spectrum utilization as measured by each competing CSMC in the set, its updated AAA, along with statistical QoS for its traffic, a 5G-U RAC is granted exclusive access to the channel for a fraction of the coordination frame duration. In other words, resource reservation in the form of a "soft airtime share" is provided.

Various options for scheduling are possible. In a first option, the scheduling may be fully distributed. In this case, inter-RAC scheduling at each CSMC is performed. This may be typical of independent deployment of 5G-U operators.

In a further embodiment, a virtually centralized model of inter-RAC scheduling is provided. In this case, a software defined networks implementation of 5G with mobile virtual network operators (MVNOs) may schedule RACs when sharing the infrastructure in the multi-tenancy mode.

Figure 14:
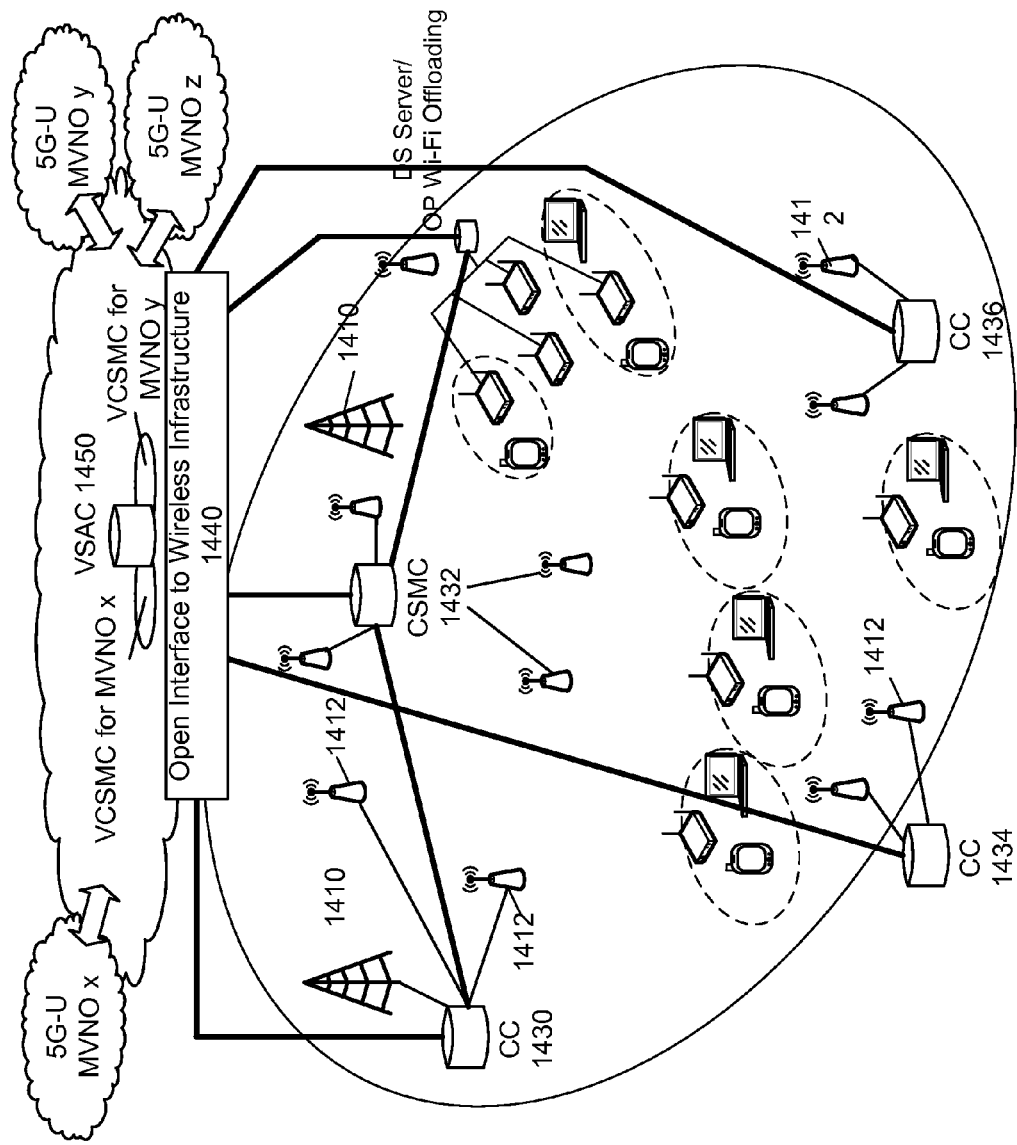
FIG. 14 is a block diagram showing an example architecture for virtually centralized coordination for multi-tenant 5G-U MVNOs in accordance with an embodiment of the disclosure.

For example, reference is made to FIG. 14, which shows an architecture for virtually centralized coordination for multi-tenant 5G-U Mobile Virtual Network Operators (MVNOs). In the embodiment of FIG. 14, base stations 1410 and TPs 1412 communicate with controllers. In this case, the controllers include controller 1430, controller 1432, controller 1434, and controller 1436.

Each of controllers 1430-1436 communicate through an open interface to a wireless infrastructure, as shown by block 1440, and in turn to a VSAC 1450.

The various MVNOs may communicate with the VSAC 1450, as shown in FIG. 14.

Further, in the example of FIG. 14, over the air signalling of the ASP may still be used for coordination at the VASC as well as per-channel frame synchronization. Also, the contend to coordinate functionality described above may be replaced by scheduled polling in some embodiments.

VSAC 1450 may encompass one or more virtual centralized spectrum management controllers (VCSMC), each pertinent to different MVNOs.

In a further embodiment, a hybrid scheduling may be performed. In this case, interaction may exist between the 5G-U RACs of Mobile Virtual Network Operators (MVNOs) and independently deployed operators.

As seen in FIG. 13, block 1300 may be performed at each CSMC for each channel, or at VSAC for each channel.

Based on the information received from the coordination beacons on the selected channel list, various input blocks may provide information to scheduling blocks. Such blocks include the achievable soft airtime shares block 1310, a received statistical QoS block 1312 and the working average allocation of airtime (AAA) copies block 1314. Block 1310 provides information on the maximum achievable soft airtime shares to a scheduler to avoid over-scheduling a channel. Block 1312 provides information on the statistical QoS of the WLAN to a scheduler to ensure fairness for the channel. The working AAA copies block 1314 provides the average allocation of airtime which is a history of the allocation in order to ensure fairness for the scheduling modules.

Information from block 1310, 1312 and 1314 are provided to each inter-RAC scheduler. As shown in FIG. 13, a scheduler exists for each of the channels in the unlicensed spectrum. The schedulers are shown by blocks 1320, 1322 and 1324 in the embodiment of FIG. 13.

Further, configuring per channel coordinating sets information is also provided as an input to the plurality of channel schedulers, shown by block 1330. This allows multiple RACs that are not neighbor sets to use a channel but still consider the underlying WLAN.

Each channel scheduler 1320, 1322 and 1324 takes the plurality of inputs and makes a scheduling decision for its channel. The output from the schedulers is provided to block 1340 to consolidate the allocated soft airtime shares. Further the output is provided to block 1314 to keep an accurate history of the scheduling.

For example, as described below, if an average deployment of a WLAN on a particular channel is 40% then the exclusive use of that channel for the 5G-U may be granted for 60% of the airtime in a particular frame to an RAC if it has been scheduled. However, such scheduling is not always linear and is based on other RACs as well.

As further shown in FIG. 13, the provision of the exclusive SATs may then be provided to a block 1350, which provides for the dynamic optimization of the frames on the allocated channels. Thus, block 1350 provides a quality of service base distribution of the SATs to create the actual channel usage for 5G-U communications. However, block 1350 is beyond the scope of the present disclosure.

Therefore, the schedulers of blocks 1320 to 1324 take the various inputs and allocate a soft airtime share for a particular RAC.

Figure 15:
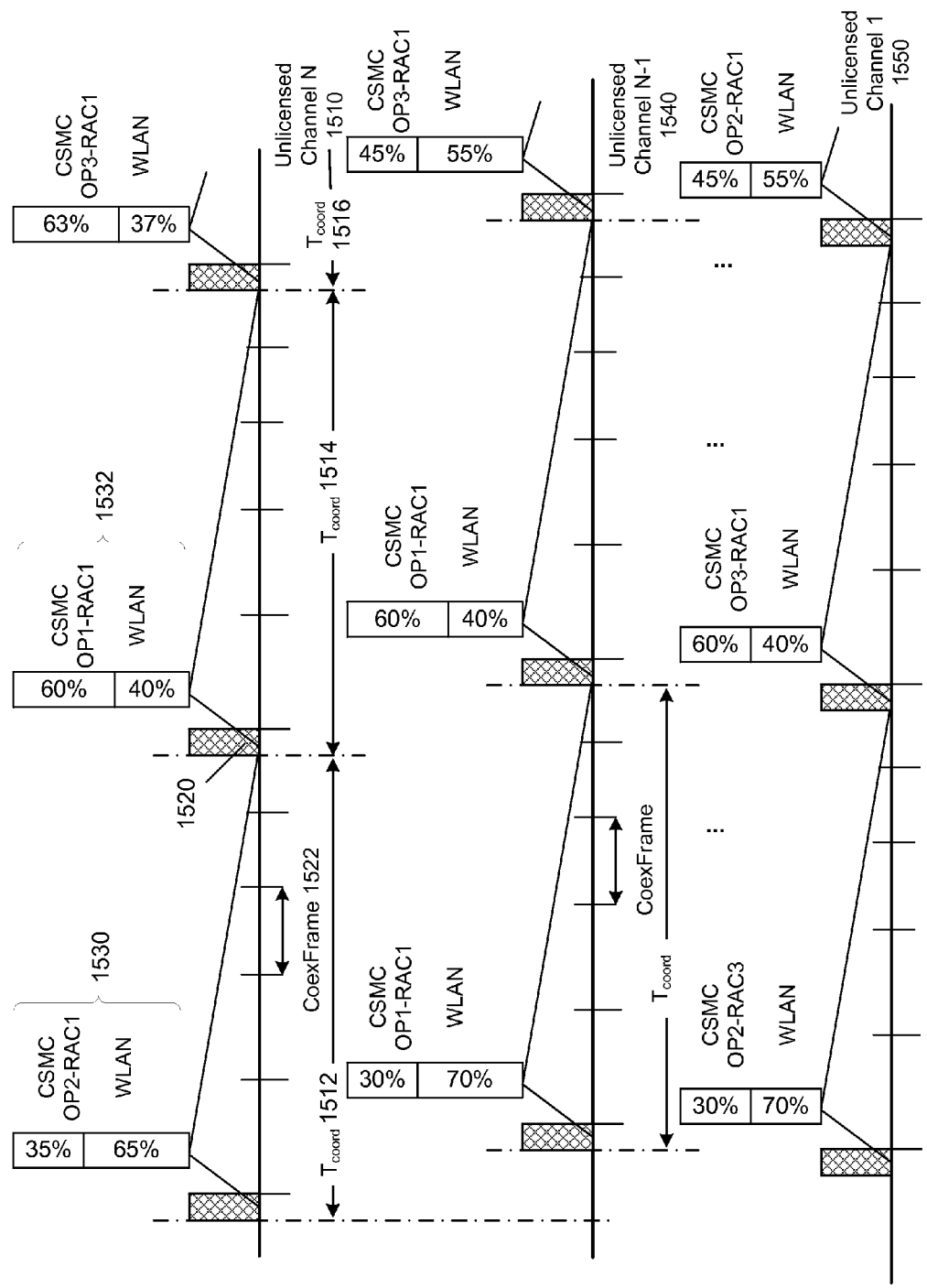
FIG. 15 is a time line showing allocation of soft airtime shares during a coordination period for a plurality of channels in accordance with an embodiment of the disclosure.

Reference is now made to FIG. 15, which shows an example result of the coordination mechanism. In the example of FIG. 15, all unlicensed channels, designated as channels 1 to N, may be coordinated. Thus, for example, channel 1510 includes a plurality of coordination frames 1512, 1514, and 1516. Each of the coordination frames includes an ASP period 1520 as well as a one or more co-existence frames 1522.

The soft airtime share is provided at the beginning of each coordination frame. Thus for channel 1510, the SAT 1530 is provided at the beginning of coordination frame 1512. The SAT indicates that the CSMC of operator 2 and RAC1 is allowed to have 35% of the airtime while the WLAN keeps 65% of the airtime. The RAC may optimize the number and size of co-existence frames within the allocated coordination frame based on the allocated SAT value and the QoS requirements of the served flows. For example, if the QoS requirements require that certain packets be sent within that coordination frame, then in some cases the RAC may be granted more resources in order to meet the quality of service requirements but the scheduler will compensate the WLAN in a subsequent frame. Similarly, SAT 1432 provides, in this subsequent coordination frame 1414, that operator 1 on RAC 1 is granted 60% of the frame while the WLAN is provided with 40% of the frame.

Similar scheduling may occur for unlicensed channel 1540. Further, as seen in FIG. 15, there is no timing synchronization required between channels 1510 and 1540.

Similarly, channel 1550 may also be allocated soft airtime shares as shown by FIG. 15.

The scheduling performed at blocks 1320, 1322 and 1324 of FIG. 13 may be done in various ways. Examples of various scheduling algorithms are provided below. However, these examples are merely meant to be illustrative and are not meant to be limiting. Any scheduling algorithm could be utilized for the soft airtime allocations.

In a first embodiment, a blind equal airtime algorithm may be used. Such an algorithm aims to achieve absolute fairness among competing 5G-U RACs in terms of useful allocated airtime. In this case, the algorithm ignores both the achievable SATs and statistical QoS from each RAC.

The scheduling algorithm may be represented in accordance with equation 1 below:

$$l_n^*(t) = \arg\max_{l \in S_n(t)} \left\{ \frac{1}{\overline{T}_l(t-1)} \right\}, \forall S_n(t) \tag{1}$$

As seen in Equation 1, $l_n^*(t)$ is the scheduled RAC on the unlicensed channel n at coordination instant t.

Further, $\overline{T}_l(t)$ is a working copy of the AAA updated after each allocation for the traffic-serving RACs, and may be represented by equation 2 below as:

$$\overline{T}_l(t) = (1-\beta)\overline{T}_l(t-1) + \beta SAT_{l^*,n^*}(t) \tag{2}$$

The * above is used to indicate the assigned RAC and channel. Intra CSMC RACs may update the same AAA.

Further, from equation 1 above, $S_n(t)$ is the set of coordinating RACs on channel n. From equation 2 above, $SAT_{l^*,n^*}(t)$ is the allocated soft airtime share for the scheduled RAC on channel n.

Therefore, utilizing equations 1 and 2 above, blind equal airtime may be achieved.

In an alternative embodiment, proportional fair airtime algorithm may be utilized. Such algorithm opportunistically aims at achieving proportional fairness among competing 5G-U RACs in terms of useful allocated airtime. However the algorithm ignores the statistically quality of service.

The algorithm may be represented by equation 3 below:

$$l_n^*(t) = \arg\max_{l \in S_n(t)} \left\{ \frac{SAT_{l,n}(t)}{\overline{T}_l(t-1)} \right\}, \forall S_n(t) \tag{3}$$

In equation 3 above, the $SAT_{l,n}(t)$ is the achievable SAT for the RAC on channel n.

In a further embodiment, a weighted fair airtime algorithm may be used. Such algorithm opportunistically aims at achieving relative fairness in allocated airtime with balanced statistical quality of service among the completing 5G-U RACs. The algorithm may be represented by equation 4 below:

$$l_n^*(t) = \arg\max_{l \in S_n(t)} \left\{ \frac{SAT_{l,n}(t)}{\overline{T}_l(t-1)} f_l(D^{max}(t)) \right\}, \forall S_n(t) \tag{4}$$

Where $D^{max}(t)$ is a vector of the RACs' statistical QoS values, and may be represented by equation 5 below:

$$D^{max}(t) = [D_1^{max}(t), D_2^{max}(t), \ldots, D_{|S_n|}^{max}(t)] \tag{5}$$

In equation 5 above, $D_l^{max}(t)$ is the statistical QoS. For example it may represent the maximum head of line packet delay normalized by its delay budget. The statistical QoS may be provided as expressed in equation 6 below.

$$D_l^{max}(t) = \max_{k \in K_l} \left\{ \frac{d_{k,l}(t)}{PDF_{k,l}} \right\} \tag{6}$$

The function related to the vector of RACs' statistical QoS may take various forms. For example, it may be a backpressure exponential rule, as provided in equation 7 below:

$$f_l(D^{max}(t)) = \exp\left( \frac{D_l^{max}(t)}{c + \sqrt{\text{mean}(D^{max}(t))}} \right) \tag{7}$$

Alternatively, a Largest Weighted Fair Queuing (LWFQ) function, as shown in equation 8 below, may be used.

$$f_l(D^{max}(t)) = D_l^{max}(t) \tag{8}$$

Figure 16:
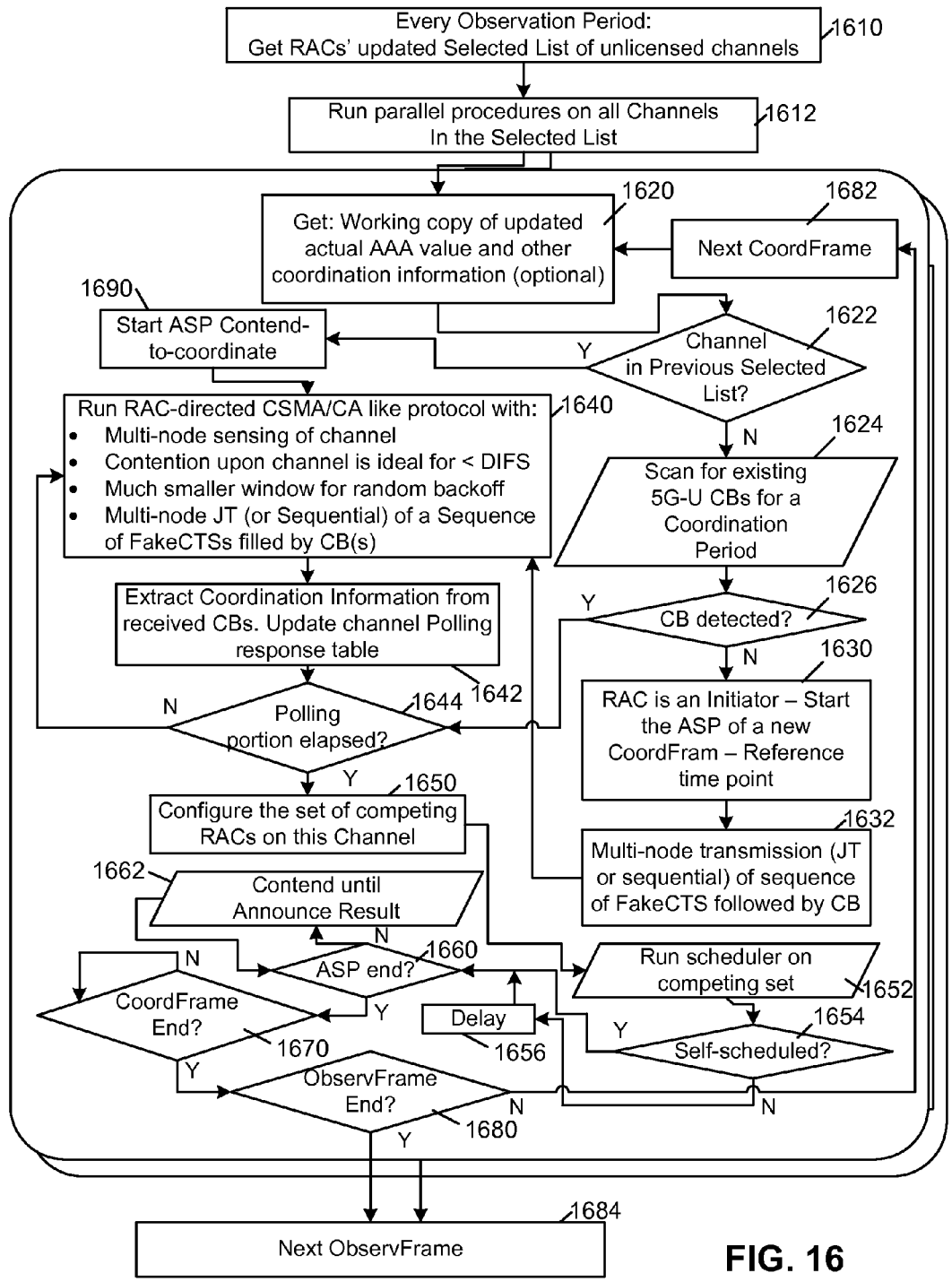
FIG. 16 is a process diagram showing a process at a CSMC for each of its RACs for contending to coordinate to receive a soft airtime share in accordance with an embodiment of the disclosure.

Therefore, the above provides for passive sensing, active sensing, coordination and scheduling of soft airframe. Reference is now made to FIG. 16 which shows a detailed flow diagram of one embodiment of the above.

As seen in FIG. 16, the process starts at block 1610 where, during every observation period the process gets the RACs updated selected list of unlicensed channels. The process then proceeds to block 1612 in which parallel procedures are run for all channels on the selected list.

In one of the parallel procedures, the process proceeds to block 1620. The process of block 1620 includes scanning a working copy of the updated actual AAA value and optionally other coordination information.

From block 1620 the process proceeds to block 1622 and checks whether or not the channel is on the previous selected list. If not, then the process proceeds to block 1624 in which the process scans for existing 5G-U coordination blocks for an entire coordination period.

If a coordination block is not detected, as determined at block 1626, then the process proceeds to block 1630 in which the RAC is designated as initiator since it does not see any other coordination blocks. The process starts the ASP of a new coordination frame a reference time point.

From block 1630 the process proceeds to block 1632 in which a multi-node transmission, either joint or sequential, of the fake CTS, followed by a coordination beacon as described above with regard to FIGS. 9 and 10, is sent.

From block 1632, the process proceeds to block 1640 in which an RAC-directed CSMA/CA like protocol is run. Such protocol includes multi-mode sensing of channels, contention upon channels being ideal for less than DFIS, much smaller windows for random backoffs are provided and a multi-mode joint or sequential sequence of fake CTSs followed by CBs are provided.

The process then proceeds to block 1642 in which the coordination of information is extracted from received coordination block and the response table for a particular RAC is updated.

The process then proceeds to block 1644 and checks whether or not the polling portion has elapsed. If not, the process proceeds back to blocks 1640 and 1642.

Once the polling portion of the process has elapsed, as determined at block 1644, the process then proceeds to block 1650 in which a set of competing RACs is configured on the channel.

The process then proceeds to block 1652 in which an inter-RAC scheduler is run for the competing set.

If the RAC is self-scheduled, then the process proceeds to block 1660 to determine whether or not the active sensing period is over. If not, the process proceeds to block 1662 in which the contention continues until results are announced.

Once the ASP has ended the process proceeds from block 1660 to block 1670 and a check is made to determine whether the coordination frame has ended. If not, the process loops until the coordination frame ends at which point the process proceeds to block 1680 in which a check is made to determine whether the observation frame has ended.

If the observation frame has not ended, the process proceeds to block 1682 in which the next coordination frame is started and the process then proceeds back to block 1620.

Once the observation frame has ended, the process proceeds from block 1680 to block 1684 in which the next observation frame is started.

From block 1622 above, if the channel was on a selected list the process proceeds to block 1690 in which the active sensing phase is started. From block 1690 the process proceeds to block 1640.

From block 1626, if a CB is detected then the process proceeds directly to block 1644.

If, at block 1654 the RAC is not self-scheduled then the process proceeds to block 1656 in which a delay is introduced, at which point the process then proceeds to block 1660.

FIG. 16 is merely an example, and other similar processes could be used.

Figure 17:
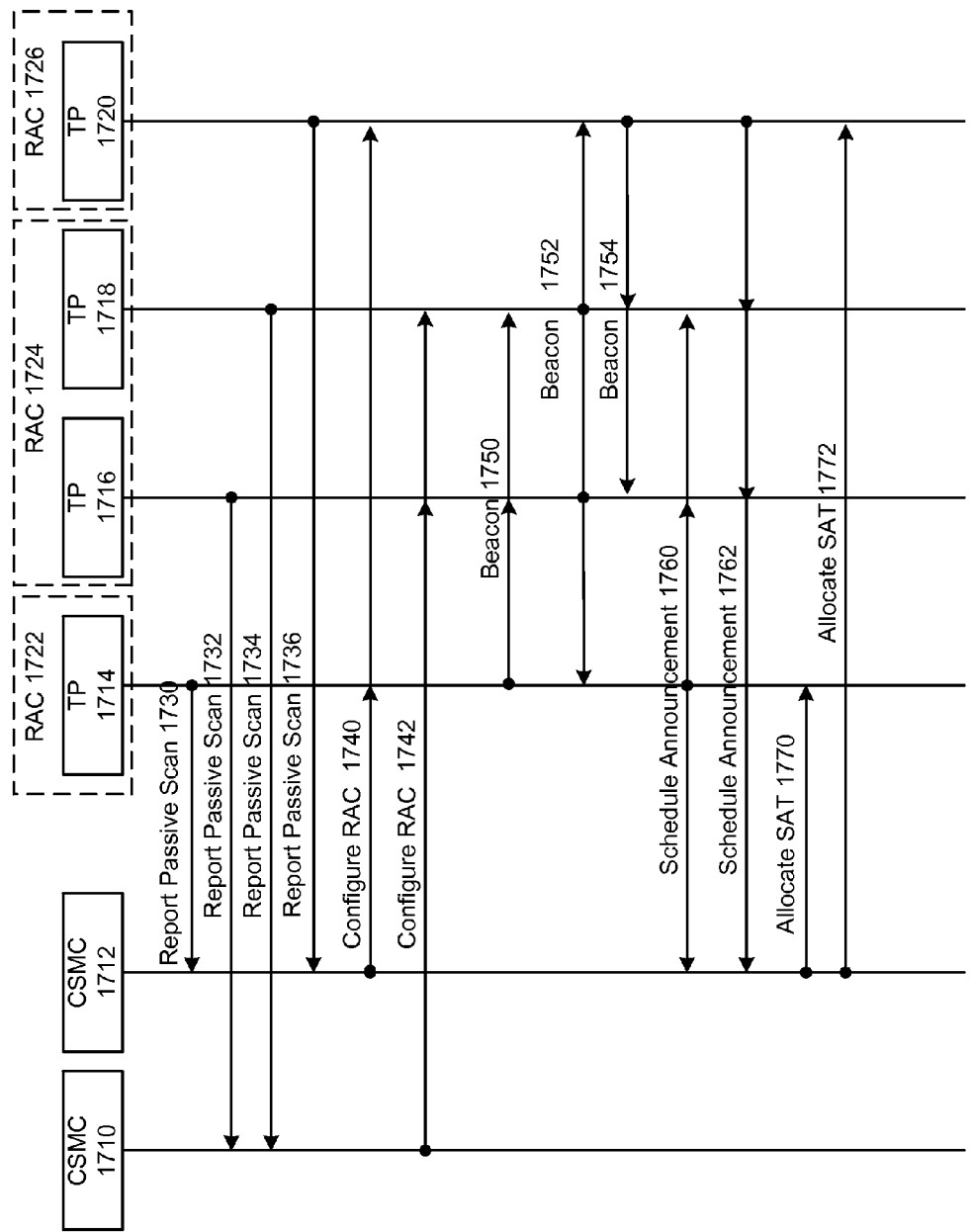
FIG. 17 is a dataflow diagram showing signaling between controllers and TP clusters in accordance with an embodiment of the disclosure.

Reference is now made to FIG. 17, which shows an example of a signaling diagram in accordance with the above.

In accordance with the embodiment of FIG. 17, two network operators operate within a geographic region. The first network operator has a CSMC 1710 and the second network operator has a CSMC 1712.

In the example of FIG. 17, four transmission points exist. These include TP 1714, TP 1716, TP 1718 and TP 1720.

At the outset, each of the TPs is configured to perform passive sensing. The results of the sensing is then reported to the CSMC of the operator to which the TP belongs. Thus, in FIG. 17, TP 1714 reports the results of its passive scan to CSMC 1712, as shown by arrow 1730. Similarly, TP 1716 reports the results of its passive scan to CSMC 1710 shown by arrow 1732. TP 1718 reports to CSMC 1710, shown by arrow 1734. TP 1720 reports the results of the scan to CSMC 1712, shown by arrow 1736.

Based on the passive scan results, each CSMC may then select a group of candidate channels in the unlicensed spectrum and then configure channel specific RACs. For example, subsets of transmission points may be grouped into radio access clusters for each channel. The grouping may be done based on similar measurements of average spectrum utilization of existing WLAN networks. The grouping may also be done based on similar achievable fractions of airtime between transmission points. Thus, in the example of FIG. 17, TP 1714 is part of RAC 1722. TPs 1716 and 1718 are part of RAC 1724. TP 1720 is part of RAC 1726.

In the example of FIG. 17, RAC 1722 is a neighbor of RAC 1724 but cannot see RAC 1726. Similarly, RAC 1726 is a neighbor of RAC 1724 but cannot see RAC 1722.

The CSMC 1710 therefore sends a configuration message to configure the RAC to the transmission points, shown by arrow 1742. Similarly, CSMC 1712 configures the RACs by sending messages shown by arrow 1740.

Once the RACs are configured, the RACs may then contend for the channel during the active sensing phase. In particular, each RAC may send a coordination beacon after a fake WLAN CTS, as described above. The beacon is sent to the neighboring RACs. If an RAC detects a beacon it may wait for a random backoff time before sending its own beacon.

Therefore, in FIG. 17, RAC 1722 sends beacon 1750, and this beacon is received by the TPs in RAC 1724. Similarly, RAC 1724 sends beacon 1752 to its neighbors. The beacon is received in this case by the TPs in RAC 1722 and RAC 1726.

Further, RAC 1726 sends its beacon 1754 to RAC 1724.

Based on the received beacons, each RAC may then perform self-scheduling to determine which RAC will take control of a channel. Various factors from the beacons may be taken into consideration when the RAC is determining whether to take control. In the case of FIG. 17, RAC 1722 determines that it has priority and therefore makes a scheduling announcement 1760. The scheduling announcement is received by both RAC 1724 and CSMC 1712.

RAC 1726 is not the priority network within its neighboring RACs. In this case, RAC 1726 may defer the scheduling to high priority RACs. However, in the example of FIG. 17, no higher priority RAC takes control of the channel and therefore RAC 1726 ultimately takes control of the channel and makes a scheduling announcement 1762. Such scheduling announcement is provided to both RAC 1724 and CSMC 1712.

Based on the received scheduling announcements, CSMC 1712 may then perform scheduling based on both the passive scan results as well as information in the scheduling announcement. The soft airtime shares are therefore allocated, as shown by arrows 1770 and 1772.

Figure 18:
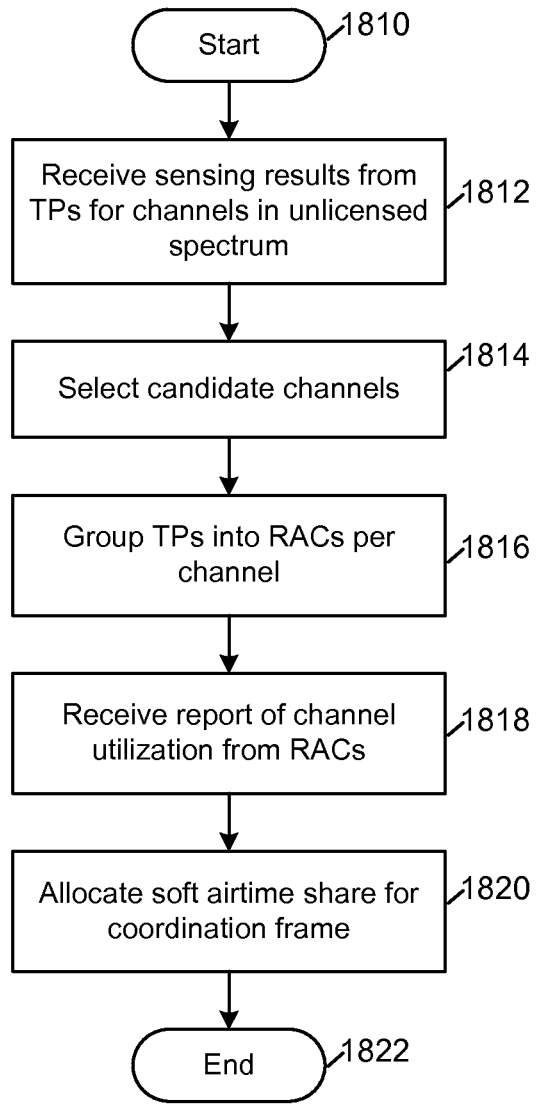
FIG. 18 is a process diagram showing a process at a network element for allocating a soft airtime share in accordance with an embodiment of the disclosure.
Figure 19:
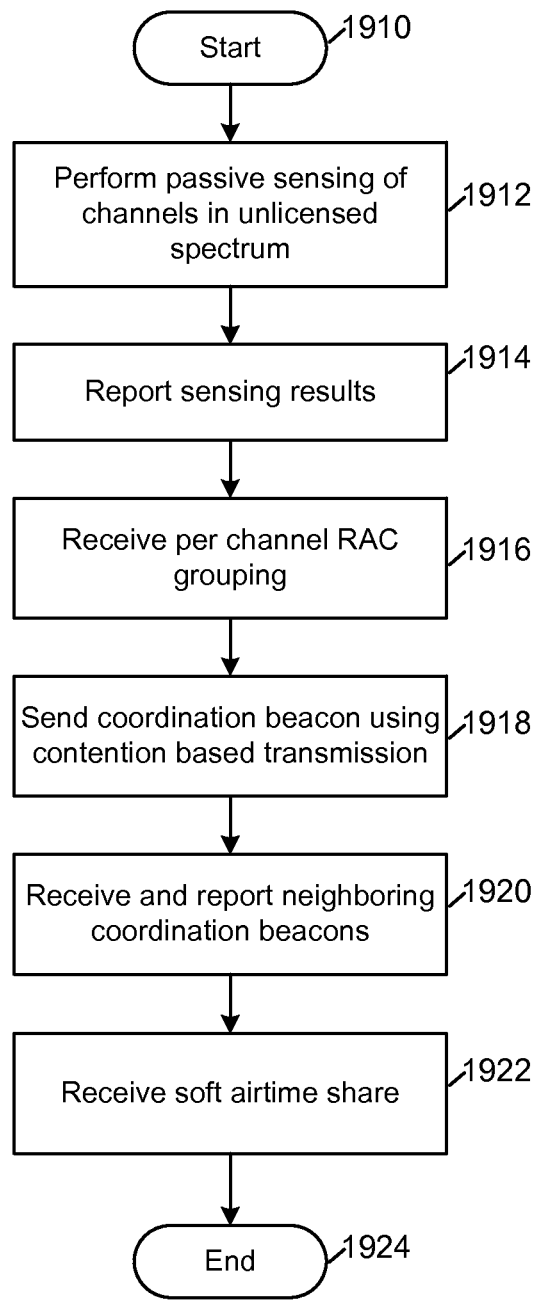
FIG. 19 is a process diagram showing a process at a TP for receiving an allocation of a soft airtime share in accordance with an embodiment of the disclosure.

The above is further illustrated with regard to FIGS. 18 and 19. In particular, FIG. 18 shows a simplified process diagram at a network element such as a CSMC for one embodiment of the present disclosure.

FIG. 18 starts at block 1810 and proceeds to block 1812 in which the network element receives sensing results from at least one TP for the sensing of channels in the unlicensed spectrum band.

From block 1812 the process proceeds to block 1814 in which the network element selects candidate channels from within the channels of the unlicensed spectrum band.

The process then proceeds to block 1816 in which the network element groups the TPs into per channel RACs. In particular, as described above, the TPs may be grouped based on geographic location as well as average spectrum utilization being close to other TPs in the area. The network element informs the TPs of their per channel RAC grouping.

From block 1816 the process then proceeds to block 1818 in which reports are received from the RACs. In an embodiment, the reports include information indicating channel utilization. Based on the report the process proceeds to block 1820 and allocates and assigns a soft airtime share for the RACs.

From block 1820 the process proceeds to block 1822 and ends.

Reference is now made to FIG. 19, which shows a process at a TP for receiving a soft airtime share allocation. In particular, the process of FIG. 19 starts a block 1910 and proceeds to block 1912 in which the TP performs passive sensing of channels in the unlicensed spectrum. The process then proceeds to block 1914 in which the TP reports the results of the sensing to a network element such as a CSMC.

The process then proceeds to block 1916 in which the TP receives a per channel RAC grouping. The TP, as part of the RAC, may then perform the active sensing as described above. Specifically, as shown by block 1918, the RAC may send a coordination beacon on a channel in a contention based transmission.

The TP will also receive neighboring coordination beacons and can report these to the network element, as shown by block 1920. In some embodiments the received neighboring coordination beacons can be consolidated into a report for the network element.

As shown by block 1922, the TP, as part of the RAC, will receive a soft airtime share for the channel from network element. The process then proceeds to block 1924 and ends.

Figure 20:
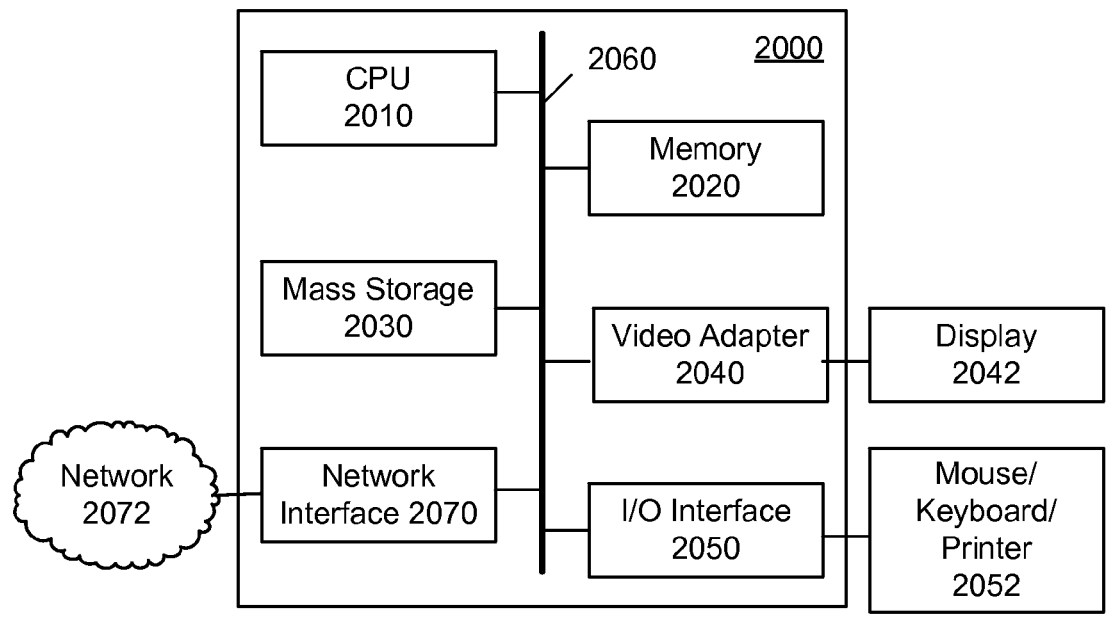
FIG. 20 is a block diagram illustrating a computing platform in accordance with an embodiment of the disclosure.

The above functionality may be implemented on any one or combination of network elements. FIG. 20 is a block diagram of a processing system 2000 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 2000 may comprise a processing unit equipped with one or more input/output devices, such as a speaker, microphone, mouse, touchscreen, keypad, keyboard, printer, display, and the like. The processing unit may include a central processing unit (CPU) 2010, memory 2020, a mass storage device 2030, a video adapter 2040, and an I/O interface 2050 connected to a bus 2060.

The bus 2060 may be one or more of any type of several bus architectures including a memory bus or memory controller, a peripheral bus, video bus, or the like. The CPU 2010 may comprise any type of electronic data processor. The memory 2020 may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device 2030 may comprise any type of storage device configured to store data, programs, and other information and to make the data, programs, and other information accessible via the bus. The mass storage device 2030 may comprise, for example, one or more of a solid state drive, hard disk drive, a magnetic disk drive, an optical disk drive, or the like.

The video adapter 2040 and the I/O interface 2050 provide interfaces to couple external input and output devices to the processing unit. As illustrated, examples of input and output devices include the display 2042 coupled to the video adapter and the mouse/keyboard/printer 2052 coupled to the I/O interface. Other devices may be coupled to the processing unit, and additional or fewer interface cards may be utilized. For example, a serial interface such as Universal Serial Bus (USB) (not shown) may be used to provide an interface for a printer.

The processing unit 2000 also includes one or more network interfaces 2070, which may comprise wired links, such as an Ethernet cable or the like, and/or wireless links to access nodes or different networks. The network interface 2070 allows the processing unit to communicate with remote units via the networks. For example, the network interface 2070 may provide wireless communication via one or more transmitters/transmit antennas and one or more receivers/receive antennas. In an embodiment, the processing unit 2000 is coupled to a local-area network or a wide-area network, shown as network 2072, for data processing and communications with remote devices, such as other processing units, the Internet, remote storage facilities, or the like.

Figure 21:
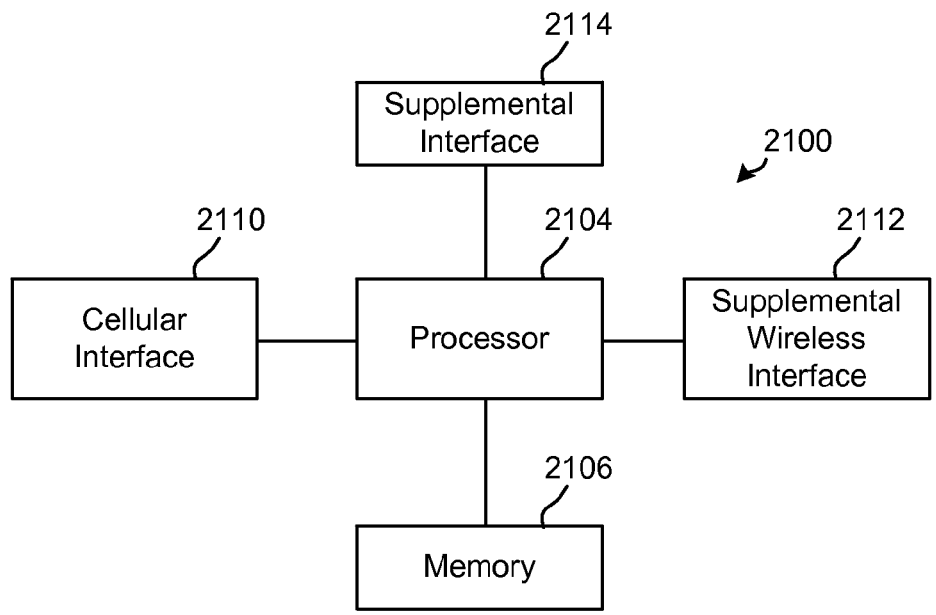
FIG. 21 illustrates a block diagram of an embodiment communications device.

FIG. 21 illustrates a block diagram of an embodiment of a communications device 2100, which may be equivalent to one or more devices (e.g., UEs, NBs, etc.) discussed above. The communications device 2100 may include a processor 2104, a memory 2106, a cellular interface 2110, a supplemental wireless interface 2112, and a supplemental interface 2114, which may (or may not) be arranged as shown in FIG. 21. The processor 2104 may be any component capable of performing computations and/or other processing related tasks, and the memory 2106 may be any component capable of storing programming and/or instructions for the processor 2104. The cellular interface 2110 may be any component or collection of components that allows the communications device 2100 to communicate using a cellular signal, and may be used to receive and/or transmit information over a cellular connection of a cellular network. The supplemental wireless interface 2112 may be any component or collection of components that allows the communications device 2100 to communicate via a non-cellular wireless protocol, such as a Wi-Fi or Bluetooth protocol, or a control protocol. The device 2100 may use the cellular interface 2110 and/or the supplemental wireless interface 2112 to communicate with any wirelessly enabled component, e.g., a base station, relay, mobile device, etc. The supplemental interface 2114 may be any component or collection of components that allows the communications device 2100 to communicate via a supplemental protocol, including wire-line protocols. In embodiments, the supplemental interface 2114 may allow the device 2100 to communicate with another component, such as a backhaul network component.

Through the descriptions of the preceding embodiments, the teachings of the present disclosure may be implemented by using hardware only or by using a combination of software and hardware. Software or other computer executable instructions for implementing one or more embodiments, or one or more portions thereof, may be stored on any suitable computer readable storage medium. The computer readable storage medium may be a tangible or in transitory/non-transitory medium such as optical (e.g., CD, DVD, Blu-Ray, etc.), magnetic, hard disk, volatile or non-volatile, solid state, or any other type of storage medium known in the art.

Additional features and advantages of the present disclosure will be appreciated by those skilled in the art.

The structure, features, accessories, and alternatives of specific embodiments described herein and shown in the Figures are intended to apply generally to all of the teachings of the present disclosure, including to all of the embodiments described and illustrated herein, insofar as they are compatible. In other words, the structure, features, accessories, and alternatives of a specific embodiment are not intended to be limited to only that specific embodiment unless so indicated.

Moreover, the previous detailed description is provided to enable any person skilled in the art to make or use one or more embodiments according to the present disclosure. Various modifications to those embodiments will be readily apparent to those skilled in the art, and the generic principles defined herein may be applied to other embodiments without departing from the spirit or scope of the teachings provided herein. Thus, the present methods, systems, and or devices are not intended to be limited to the embodiments disclosed herein. The scope of the claims should not be limited by these embodiments, but should be given the broadest interpretation consistent with the description as a whole. Reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims.

Furthermore, nothing herein is intended as an admission of prior art or of common general knowledge. Furthermore, citation or identification of any document in this application is not an admission that such document is available as prior art, or that any reference forms a part of the common general knowledge in the art. Moreover, nothing disclosed herein is intended to be dedicated to the public regardless of whether such disclosure is explicitly recited in the claims.

The invention claimed is:

1. A method at a transmission point for obtaining resources of a channel in an unlicensed spectrum band, the method comprising:
    Performing sensing on a plurality of channels;
    providing a report to a network element in accordance with results of the sensing;
    receiving a message providing at least one radio access cluster for the transmission point per channel;
    contending, on behalf of the at least one radio access cluster, with other radio access clusters to send a coordination beacon on a channel;
    receiving coordination beacons from neighboring radio access clusters on the channel;
    reporting information from the coordination beacons to the network element; and
    receiving an allocation of resources for the channel.

2. The method of claim 1, wherein the contending to send a coordination beacon is performed jointly with other transmission points in the radio access cluster.

3. The method of claim 1, wherein the contending to send a coordination beacon is performed sequentially with other transmission points in the radio access cluster.

4. The method of claim 1, wherein the contending to send a coordination beacon is preceded by a fake wireless local area network clear to send message.

5. The method of claim 1, wherein the sending the coordination beacon includes sending information including at least one of: an operator identifier, a controller identifier, a radio access cluster identifier, a beacon order, a remaining time in an active sensing phase, the controller's updated actual airtime allocation, a short term wireless local area network average spectral utilization, and statistical quality of service measure of the radio access cluster traffic.

6. The method of claim 1, wherein the contending to send includes waiting a random backoff time from a last detected sequence to send the coordination beacon.

7. The method of claim 1, wherein the receiving an allocation of resources includes a flexible portion of resources for other users of the channel in the unlicensed spectrum.

8. The method of claim 7, wherein the other users utilize resources for wireless local area networks and wherein the flexible proportion of resources includes a proportion of the time slot for the channel to the radio access cluster of the transmission point and a proportion of the channel to the wireless local area network.

9. A transmission point receiving resources of an unlicensed spectrum band, the transmission point comprising a processor configured to:
    perform sensing on a plurality of channels;
    provide a report to a network element in accordance with results of the sensing;
    receive a message providing at least one radio access cluster for the transmission point per channel;
    contend, on behalf of the at least one radio access cluster, with other radio access clusters to send a coordination beacon on a channel;
    receive coordination beacons from neighboring radio access clusters on the channel;
    report information from the coordination beacons to the network element; and
    receive an allocation of resources for the channel.

10. The transmission point of claim 9, wherein the transmission point is configured to contend to send a coordination beacon jointly with other transmission points in the radio access cluster.

11. The transmission point of claim 9, the transmission point is configured to contend to send a coordination beacon sequentially with other transmission points in the radio access cluster.

12. The transmission point of claim 9, wherein the transmission point is configured to contend to send a coordination beacon preceded by a fake wireless local area network clear to send message.

13. The transmission point of claim 9, wherein the coordination beacon includes information selected from: an operator identifier, a controller identifier, a radio access cluster identifier, a beacon order, a remaining time in an active sensing phase, the controller's updated actual airtime allocation, a short term wireless local area network average spectral utilization, and statistical quality of service measure of the radio access cluster traffic.

14. The transmission point of claim 9, wherein the transmission point is configured to contend to send by waiting a random backoff time from a last detected sequence to send the coordination beacon.

15. The transmission point of claim 9, wherein the flexible proportion of resources accounts for other users of the channel in the unlicensed spectrum.

16. The transmission point of claim 9, wherein the other users utilize resources for wireless local area networks and wherein the flexible proportion of resources includes a proportion of the time slot for the channel to the radio access cluster of the transmission point and a proportion of the channel to the wireless local area network.

17. A method at a transmission point for obtaining resources of a channel in an unlicensed spectrum band, the method comprising:
    performing sensing on a plurality of channels;

providing a report to a network element in accordance with results of the sensing;
receiving a message providing at least one radio access cluster for the transmission point per channel;
contending with other radio access clusters to send a coordination beacon on a channel;
receiving coordination beacons from neighboring radio access clusters on the channel;
reporting information from the coordination beacons to the network element; and
receiving an allocation of resources for the channel,
wherein the contending to send a coordination beacon is preceded by a fake wireless local area network clear to send message.

18. A transmission point receiving resources of an unlicensed spectrum band, the transmission point comprising a processor configured to:
perform sensing on a plurality of channels;
provide a report to a network element in accordance with results of the sensing;
receive a message providing at least one radio access cluster for the transmission point per channel;
contend with other radio access clusters to send a coordination beacon on a channel;
receive coordination beacons from neighboring radio access clusters on the channel;
report information from the coordination beacons to the network element; and
receive an allocation of resources for the channel,
wherein the transmission point is configured to contend to send a coordination beacon preceded by a fake wireless local area network clear to send message.

* * * * *